US008705345B2

United States Patent
Kamal et al.

(10) Patent No.: US 8,705,345 B2
(45) Date of Patent: Apr. 22, 2014

(54) NETWORK PROTECTION USING NETWORK CODING

(75) Inventors: Ahmed E. Kamal, Ames, IA (US); Salah A. Aly, Ames, IA (US)

(73) Assignee: Iowa State University Research Foundation, Inc., Ames, IA (US)

( * ) Notice: Subject to any disclaimer, the term of this patent is extended or adjusted under 35 U.S.C. 154(b) by 665 days.

(21) Appl. No.: 12/192,765

(22) Filed: Aug. 15, 2008

(65) Prior Publication Data

US 2009/0135717 A1    May 28, 2009

Related U.S. Application Data

(60) Provisional application No. 60/990,179, filed on Nov. 26, 2007.

(51) Int. Cl.
*G01R 31/08* (2006.01)

(52) U.S. Cl.
USPC .......................................................... 370/217

(58) Field of Classification Search
USPC ......... 370/216, 225, 217, 228, 229, 221, 235, 370/389, 390, 392, 218, 230, 242–245
See application file for complete search history.

(56) References Cited

U.S. PATENT DOCUMENTS

| | | | |
|---|---|---|---|
| 5,007,067 A | 4/1991 | Ayanoglu et al. | |
| 5,257,261 A | 10/1993 | Parruck et al. | |
| 6,366,875 B1 * | 4/2002 | Colizzi et al. | 703/16 |
| 6,404,734 B1 | 6/2002 | Stamatelakis et al. | |
| 7,260,059 B2 * | 8/2007 | Grover et al. | 370/222 |
| 7,308,198 B1 | 12/2007 | Chudak et al. | |
| 7,349,440 B1 * | 3/2008 | Chou et al. | 370/503 |
| 7,398,321 B2 | 7/2008 | Qiao et al. | |
| 7,590,756 B2 * | 9/2009 | Chan | 709/238 |
| 7,609,624 B2 | 10/2009 | Alicherry et al. | |
| 7,643,407 B2 | 1/2010 | Benvenuti et al. | |
| 7,756,051 B2 * | 7/2010 | Rodriguez et al. | 370/252 |
| 2003/0058798 A1 * | 3/2003 | Fleischer et al. | 370/238 |
| 2005/0198524 A1 | 9/2005 | Benvenuti et al. | |
| 2006/0098660 A1 * | 5/2006 | Pal et al. | 370/395.51 |
| 2006/0164976 A1 | 7/2006 | Grover et al. | |
| 2007/0153674 A1 | 7/2007 | Alicherry et al. | |
| 2008/0068983 A1 * | 3/2008 | Dunbar et al. | 370/216 |
| 2008/0075080 A1 * | 3/2008 | Katabi et al. | 370/392 |
| 2009/0046572 A1 | 2/2009 | Leung | |

OTHER PUBLICATIONS

Grover, Wayne D., "Mesh-Based Survivable Networks: Options and Strategies for Optical, MPLS, Sonet, and ATM Networking", Upper Saddle River, NJ: Prentice-Hall 2004.
Hernandez-Valencia, Enrique, "The Generic Framing Procedure (GFP): An Overview" IEEE Communications Magazine, May 2002, pp. 63-71.
Stamatelakis, Demetrios, "IP Layer Restoration and Network Planning Based on Virtual Protection Cycles", IEEE Journal on Selected Areas in Communications, vol. 18, No. 10, Oct. 2000, pp. 1938-1949.
Zhou, Dongyun et al., "Survivability in Optical Networks", IEEE Network, #0890-8044, Nov./Dec. 2000, pp. 16-23.
Kamal, Ahmed E., P08237US01, U.S. Appl. No. 12/323,598, Office Action Dated May 12, 2010. 13 pages.

* cited by examiner

*Primary Examiner* — Anh Ngoc Nguyen
(74) *Attorney, Agent, or Firm* — McKee, Vorhees & Sease, P.L.C.

(57) ABSTRACT

A method for protecting against link failures in a communications network having a plurality of paths between senders and receivers is provided. The method includes sending data units by the senders over the communications network on working circuits, applying network coding to form a combination of data units from data units from a plurality of the senders, and sending the combination of data units over the communications network on a backup circuit. If one or more link failures occur in the working circuits resulting in loss of one or more of the data units, then the method further includes recovering the one or more of the data units from the combination of data units transmitted on the backup circuit. The backup circuit used to carry the combination of data units may be implemented in-band with user data or may be implemented as out-of-band backup circuits.

13 Claims, 9 Drawing Sheets

NETWORK PROTECTION USING NETWORK CODING

GRANT REFERENCE

This invention was made with government support under Grant No. CNS0626741 and Grant No. CNS0721453 awarded by NSF. The government has certain rights in the invention.

CROSS-REFERENCE TO RELATED APPLICATIONS

This application claims priority under 35 U.S.C. §119 of a provisional application Ser. No. 60/990,179 filed Nov. 26, 2007, which application is hereby incorporated by reference in its entirety.

FIELD OF THE INVENTION

The present invention relates to network protection.

BACKGROUND OF THE INVENTION

One of the important operational requirements of networks is to provide uninterrupted service in the face of failures. This is usually known as network survivability or network resilience, and network service providers consider this requirement to be one of the key requirements that is usually demanded by customers. Depending on the type of the network, and the technology employed therein, failures may be more frequent, and even more catastrophic for one type of networks as compared to other types of networks. For example, in networks implemented with optical fibers as the physical transmission medium, large amounts of bandwidth are provided on a single wavelength channel, and huge amounts of traffic are carried on the fiber, especially if dense wavelength division multiplexing (DWDM) is used. Fibers, however, can be damaged accidentally with a probability that is much higher than the damage probability for other types of physical media. The failure of a single fiber, which is not uncommon, can therefore affect a large number of users and connections. Hence, it is very important to provide a high degree of survivable network operation in the face of failures in optical communication networks.

A large number of techniques for providing optical network survivability have been introduced. Such techniques can be classified as either Predesigned Protection, or Dynamic Restoration techniques (D. Zhou and S. Subramaniam, "Survivability in optical networks," IEEE Network, vol. 14, pp. 16-23, November/December 2000). In predesigned protection, which is a proactive technique, bandwidth is reserved in advance so that when a failure takes place, backup paths which are pre-provisioned, are used to reroute the traffic affected by the failure. These techniques include the 1+1 protection, in which traffic of a lightpath is transmitted on two link disjoint paths, and the receiver selects the stronger of the two signals; 1:1 protection, which is similar to 1+1, except that traffic is not transmitted on the backup path until failure takes place; and 1:N protection, which is similar to 1:1, except that one path is used to protect N paths. A generalization of 1:N is the M:N, where M protection paths are used to protect N working paths. Protection techniques are widely used in SONET ring networks (D. Zhou and S. Subramaniam, "Survivability in optical networks," IEEE Network, vol. 14, pp. 16-23, November/December 2000). Under dynamic restoration, which is a reactive strategy, capacity is not reserved in advance, but when a failure occurs spare capacity is discovered and is used to reroute the traffic affected by the failure. Protection techniques can recover from failures quickly, but require significant amounts of resources. On the other hand, restoration techniques are more cost efficient, but are much slower than their protection counterparts.

The concept of p-Cycles was recently introduced to emulate the protection techniques of SONET ring networks, and they provide 1:N protection to connections with the same transport capacity, e.g., DS-3. p-Cycles provide protection against single link failures to a connection with its two end nodes being on the cycle. However, under p-Cycles, and because of the shared protection, failures must still be detected, and traffic must be rerouted on the cycle. (D. Stamatelakis and W. D. Grover, "Theoretical underpinnings for the efficiency of restorable networks using preconfigured cycles (p-cycles)," IEEE Transactions on Communications, vol. 48, no. 8, pp. 1262-1265, 2000; D. Stamatelakis and W. D. Grover, "Ip layer restoration and network planning based on virtual protection cycles," IEEE Journal on Selected Areas in Communications, vol. 18, no. 10, pp. 1938-1949, 2000; and W. D. Grover, Mesh-based survivable networks: options and strategies for optical, MPLS, SONET, and ATM Networking. Upper Saddle River, N.J.: Prentice-Hall, 2004).

Recently, one of the present inventors introduced another new concept for protection, namely, 1+N protection described in U.S. Provisional Patent Application No. 60/990,183, filed Nov. 26, 2007, herein incorporated by reference in its entirety. The technique is based on using a bidirectional p-Cycle to protect a number of link disjoint connections which are straddling from the cycle, and using network coding (R. Ahlswede, N. Cai, S.-Y. R. Li, and R. W. Yeung, "Network information flow," IEEE Transactions on Information Theory, vol. 46, pp. 1204-1216, July 2000) to transmit modulo-2 sums of the connections' signals on the cycle. A failure of any link on a working path can be recovered from by using a decoding operation of the signals transmitted on the p-Cycle. This strategy was introduced to provide 100 percent protection against single link failures. The 1+N protection can be implemented at a number of layers, and using a number of protocols.

Despite advancements in the field, problems remain. Therefore, it is a primary objective of the present invention to provide network protection.

It is a further object, feature, or advantage of the present invention to reduce the amount of resources needed to provide network protection.

It is also an objective, feature, or advantage to recover from the failure as fast as possible, and without invoking management and control plane functionalities.

Yet another object, feature, or advantage of the present invention is to reduce the costs and effects of failures on a network by providing network protection.

One or more of these and/or other objects, features, or advantages of the present invention will become apparent from the specification and claims that follow.

SUMMARY

A method for protecting against link failures in a communications network having a plurality of paths between senders and receivers is provided. The method includes sending data units by the senders over the communications network, applying network coding to form a combination of data units from data units from a plurality of the senders, and sending the combination of data units over the communications network. If one or more link failures occur resulting in loss of one or more of the data units, then the method further includes recovering the one or more of the data units from the combination of data units. The combination of data units may be sent in-band with user data or may be sent over one or more backup paths.

DETAILED DESCRIPTION

Figure 1:
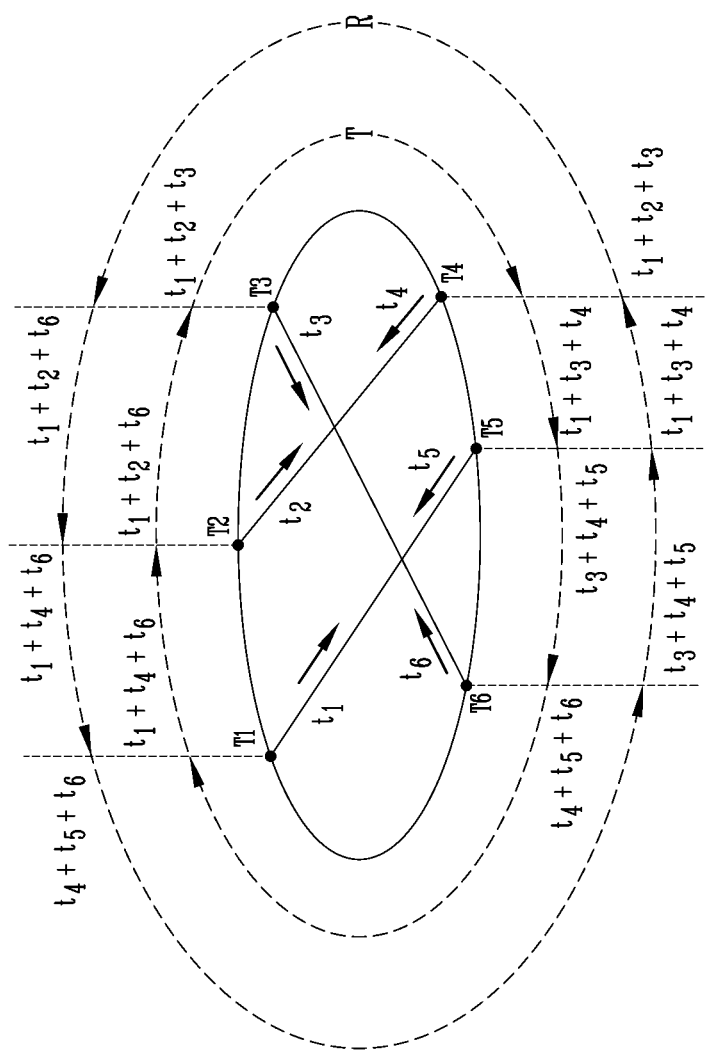
FIG. 1 is a diagram illustrating 1+N protection using p-Cycles.

The present invention includes a number of different strategies relating to network protection against various types of failures. In a first embodiment, discussed primarily in section 1, a methodology for providing 1+N protection is described. In this section, network coding is used to combine a number of signals on one protection circuit. This method can be used to provide 100 percent 1+N protection against single link failures. The single protection circuit or backup circuit is shared between N sessions by applying a network coding technique to the data. The use of the network coding technique uses the same resources required by a 1:N technique, but at the speed of the 1+1 method.

In a second embodiment, discussed primarily in section 2, a modified 1+N protection is described, which is a modification of the strategy of section 1. The modified strategy may result in the requirement of fewer network resources for protection, at the expense of requiring one of the network nodes, that is not necessarily a transmitter or a receiver, to play a special role to facilitate the protection.

In a third embodiment, discussed primarily in section 3, a methodology is provided for protecting against a single link failure in optical networks. Network coding and reduced capacity are used on the working paths to provide a backup protection that will carry encoded data from all sources. In addition, implementation aspects are provided regarding how to deploy the method in the case of an optical network with n disjoint working paths.

In a fourth embodiment, discussed primarily in section 4, a methodology is provided for network protection for two link failures in optical networks. Network coding and reduced capacity are used on the working paths to provide backup protection paths.

In a fifth embodiment, discussed primarily in section 5, a methodology for network protection is provided which protects against multiple link failures and can be implemented at an overlay layer.

In a sixth embodiment, discussed primarily in section 6, a methodology is provided for protection against node failures using network coding, and using the reduced capacity technique.

Each section may also include discussion regarding advantages or disadvantages relative to previously described embodiments. It is to be understood, that different embodiments may be more suitable for particular applications or environments than other embodiments. As such, different embodiments may provide different features or advantages. It is further to be understood that the present invention is not to be limited to the specific embodiments provided herein.

1. 1+N Protection Against Single Link Failures

According to one aspect of the present invention, a method is provided for 100 percent 1+N protection against single link failures. This aspect of the present invention includes a technique to provide transparent non-stop service in communication networks. If a communication link such as an optical fiber or cable fails, communication can still proceed in a transparent manner. That is to say without the network management or control planes having to be aware of it, or intervene to divert data to backup links. The bandwidth requirement for providing this service is on the order of that required by a single communication session, therefore a significant saving in resources is achieved. The method can provide 100 percent protection against single link failures for unidirectional and bidirectional connections, where the bidirectional connections may have either symmetric or asymmetric bandwidth requirements.

The method provides two copies of the same data unit to the receiver of each communication session. One copy is delivered on the working path, while the second copy is extracted through simple network coding operations. A group of session have their data units linearly combined and transmitted over a protection circuit. In addition data units received over the working circuits are also linearly combined by the receivers. In the case of the failure of one of the working circuits, these two combinations provide two equations from which the data units that could not be delivered over the failed working circuit can be extracted by the receiver. The coding operation is implemented using a simple addition operation. The coding results in a significant reduction in the bandwidth, since only bandwidth requirements on the order of that required by a single communication session are needed. Moreover, if there is a failure on a working path, recovery can be done without involving either of the management or control planes. Moreover, even if there are no failures, since two copies of the same signal are received by a receiver, one on the working path, and one on the protection paths, this provides an error detection and correction technique. This added functionality comes at no cost. The advantages of such a methodology include, without limitation, (1) transparent protection against single link failures, (2) fast protection, since no failure detection, failure location or switching are involved, (3) reduced bandwidth and resource requirements, since multiple communication sessions will be using the same resources required to protect a single session, (4) simpler control and management plans, and (5) error detection and correction.

The method can be used in any communication network in order to guarantee non-stop service, and transparent recovery from failures without involving the control or management plane. It also provides a method for error detection and correction. Hence, the methodology allows for serving the dual purposes of error control and protection against link failures.

Protection circuits are either 1+1, where a single session is protected by duplicating the resources required by the session which are used to send a second copy of the signal, and hence recovery from failures is instantaneous, or 1:N, where resources for a single session are shared between N sessions, but this requires the detection of the failure occurrence and failure location, and determining which session should use the backup facilities. The first technique is fast, but requires at least 100 percent extra resources. The second technique is more efficient, but slow since the management and control planes must be involved.

What is proposed in similar to the 1+1, except that one backup circuit is shared between N sessions, and data from all N sessions is transmitted on the backup circuit, but in a specially encoded way. The use of the network coding technique results in a significant saving over the 1+1 method, namely, using resources similar to those required by the 1:N method, but at the speed of the 1+1 method.

The methodology provides for:

Reduced cost of bandwidth resources, since a single backup circuit can protect multiple working circuits.

Fast and speedy recovery from failures, since a receiver would be receiving a second copy of the data unit from the same source over the protection circuits.

No need to involve the management plane in detecting and locating failures, hence simplifying the management plane.

No need to involve the control plane in rerouting or switching data in order to recover from failures, hence simplifying the control plane.

Provision for error detection and correction in the absence of failures at no added cost.

Possibility of implementation at higher layers with a speed of recovery that is comparable to that achieved at lower layers.

This aspect of the present invention provides for protection of multiple communication sessions using the bandwidth resources on the order of those required to protect a single communication session. This is facilitated through the use of network coding on the protection circuit. Data units transmitted by a group of sources on the working circuits are linearly combined using network coding, and more particularly, but without limitation, the XOR function, and then transmitted on a protection circuit. All receivers of the group of sources receive this linear combination. At the same time, data unites received by the receivers over the working circuits are also linearly combined using the XOR function and transmitted back to all receivers. If a working circuit fails, the XOR of these two linear combinations at the receiver of the failed circuit recovers the data unit. The technique is fast, requires resources on the order of those needed to protect a single circuit, and provides error detection and correction as a by-product.

1.1 Overview

This aspect of the present invention includes a general strategy for providing 100% 1+N protection against single link failures in mesh networks. That is, to transmit signals from N connections on one common circuit, such that when a failure occurs, the end nodes of the connection affected by the failure will be able to recover the signals lost due to failure. This is done by combining signals from a number of connections using the technique of network coding, and transmitting this combination on the backup circuit. Hence, survivability is provided without explicitly detecting failures, and rerouting of the signal is not needed. Both the management and control planes in this case will be simpler, as they only need to detect the failure for the purpose of repairing it. The physical layer itself may be based on optical fibers or other types of technology, and therefore the technique is independent of the type of the physical layer. The technique may also be implemented at higher layers.

The method provides two copies of the same signal on two link disjoint circuits. One circuit is the working circuit, or working path, while the protection circuit consists of two circuits: 1) a group of circuits from the sources to the destinations, which we call the primary protection circuit; and 2) a group of circuits from the destinations back to themselves, which we refer to as the secondary protection circuit. On both protection circuits, signals are combined using simple network coding operations, namely, addition over the GF(2) field. Such linear combinations contain enough information to recover a signal that is lost by the failure of the working path.

The scheme has the following properties:

1) Protection against single link failure is guaranteed.

2) It protects unidirectional connections, and therefore allows asymmetric connections to be protected in an efficient manner.

3) The scheme is much more efficient than 1+1 protection.

In addition, and as a byproduct, in the absence of failures, this scheme provides an error correction functionality, where a data unit corrupted on the working circuit can be recovered from the protection circuit.

In Section 1.2 we provide a brief background on the scheme for 1+N protection using network coding over p-Cycles. In Section 1.3 we introduce the network model, and a few definitions and operational assumptions. We illustrate the basic concept of our strategy by giving an example of using network coding to provide protection against a single link failure in Section 1.4, which is then followed by the description of the general strategy. A number of special cases need special handling, which may result in protecting a group of connections which may otherwise be unprotectable jointly, or may result in reducing the amount of protection resources even further. Such cases are accommodated using either a pre-processing or a post-processing algorithm. The special cases and these two algorithms are also described in Section 1.4. Finally, the description regarding this embodiment is concluded with some remarks in Section 1.5.

1.2 Background: 1+N Protection Using P-Cycles

In this section we provide a brief description of the 1+N protection scheme developed in A. E. Kamal, "1+n protection in optical mesh networks using network coding on p-cycles," in the proceedings of the IEEE Globecom, 2006. This technique is based on the use of the new technique of network coding (R. Ahlswede, N. Cai, S.-Y. R. Li, and R. W. Yeung, "Network information flow," IEEE Transactions on Information Theory, vol. 46, pp. 1204-1216, July 2000) over p-Cycles (W. D. Grover and D. Stamatelakis, "Cycle-oriented distributed preconfiguration: Ring-like speed with mesh-like capacity for self-planning network restoration," in Conference Record of the International Conference on Communications (ICC), pp. 537-543, 1998). Network coding refers to performing linear coding operations on traffic carried by the network at intermediate network nodes. A node that receives information from all, or some of its input links, encodes this information, and sends the information to all, or some of its output links. This approach can result in enhancing the network capacity, hence facilitating the service of sessions which cannot be otherwise accommodated, especially under multicasting.

Addition operations over GF(2) field, i.e., modulo-2 or XOR operations were used to introduce the 1+N protection scheme. In the scheme, a p-Cycle is provisioned to protect a number of connections, or paths. Paths protected by the same p-Cycle must be link disjoint with each other, and with the p-Cycle. It was assumed that the capacities of all connections are the same, which is also equal to the capacity of the p-Cycle. End nodes of the connections are denoted by $T_i$, and they are in the set T. Transmissions are in terms of fixed size data units, and all transmissions occur in rounds. If the two end nodes of a connection are $T_i$ and $T_j$, then $T_i$ sends data units $t_i(n)$ to node $T_j$ in round n. Similarly, node $T_j$ sends data units $t_j(n)$ to node $T_i$ in round n. An example is shown in FIG. 1, where the connection pairs are $(T_1; T_5)$, $(T_2; T_4)$ and $(T_3; T_6)$.

The p-Cycle, which is used to provide backup copies of signals, carries data units in two directions, the clockwise direction, T, and the counter-clockwise direction, R. In each direction, data is transmitted in rounds, such that there are a rounds on the cycle simultaneously, where $$a = \left\lceil \frac{\tau}{(\text{data unit size in bits})/B} \right\rceil \quad (1.1)$$

and $\tau$ and B are the round trip propagation delay around the p-Cycle, and the bandwidth of the p-Cycle, respectively. Each round is identified by two fields:

1) The round number field, n, which is sequentially updated by a special node called the monitor node.

2) A bit map field, with one bit for each node using the cycle, which is used to indicate if the data unit transmitted on the p-cycle belongs to this round, n, or to round n−a. If node $T_i$ which has a connection to node $T_j$ receives a combined data unit with a round number, n, it complements its map bit. If the map bit of node $T_j$ matches that of node $T_i$, then data units put on the cycle by $T_j$ belong to round n. Otherwise, they belong to round n−a.

Each node, $T_i$, which communicates with node $T_j$, will execute two steps:

Step I: It will add the following data units to round n on T:
1) A new $t_i(n)$, which will add this data unit to T, and
2) Either $t_j(n)$ or $t_j(n-a)$, depending on the bit map of node $T_j$. Such data units are received by $T_i$ on the working path, and their addition to T will remove the data units added by $T_j$ to T in step I.1.

Step II: It will add the following data units to R:
1) A new $t_j(n)$ which is received on the working path, and
2) Either $t_i(n)$ or $t_i(n-a)$, also depending on the bit map of node $T_j$. This will also remove the data unit added by $T_j$ in step II.1.

Node $T_i$, in addition to receiving $t_j(n)$ on the working path, can receive another copy by adding:

The signal received on T,

The signal received on R, and

The $t_i$ data unit, generated by $T_i$, and received by $T_j$ which it added to R.

For example, in FIG. 1, node $T_5$ adds the signals received on T and R in addition to $t_5^S$ to obtain $t_1^S$.

Our objective in this embodiment is to use network coding with a group of unicast, unidirectional sessions in order to provide protection for such connections in a manner that does not depend on using a p-Cycle structure to implement the protection circuit. Since the protection circuit is not limited in topology to a cycle, this approach can result in a greater saving in the number of protection circuits.

1.3. Definitions and Assumptions

In this section we introduce a number of definitions and assumptions about the network, the connections to be protected, and which connections are protected together.

The network is represented by the graph G(V,E), where V is the set of nodes, and E is the set of bidirectional edges in the graph. For the network to be protected, we assume that the graph is at least 2-connected, i.e., between any pair of nodes, there is at least two link-disjoint paths. A node can be a router, or a switch, depending on the graph abstraction level and the protection layer. Following the terminology in [5], we refer to an edge in the graph as a span. A span between two nodes contains a number of channels. The type and number of channels depends on the type of the span, and also on the layer at which the connection is provisioned, and protection is provided. We refer to each of these channels as a link. For example, at the physical layer, the span may be a fiber, and the link may be a wavelength channel, or even circuits with sub-wavelength granularities, e.g., DS3, if a technique like traffic grooming is used.

There is a set C of unicast connections that need to be provisioned in the network such that 100% 1+N protection is guaranteed. The total number of connections is given by N=|C|. It is assumed that all connections require the same bandwidth, B, and this bandwidth is allocated in terms of a circuit on a single link, i.e., single hop, or may consist of a sequential set of circuits on multiple sequential links, i.e., multihop. Therefore, link protection is a special case of this technique.

Connections are unidirectional, and a connection $c_j$ from source $S_j$ to destination $D_j$ will transmit data units $d_j^{(n)}$, where n is the sequence number, or round number in which the data unit is transmitted. Connection $c_j \in C$ is identified by the tupple$<S_j, D_j, d_j^{(n)}>$. A bidirectional connection will be treated as two independent unidirectional connections.

All data units are fixed in size.

The protection scheme, Generalized 1+N protection, will guarantee that every destination node, $D_j$, will receive two copies of the data unit $d_j^{(n)}$, one on the working circuit, and another on the protection circuit(s).

It may not be possible to protect all N connections together. In this case, the set of connections, C, is partitioned into K subsets of connections, $C_i$ for $1 \leq i \leq K$, where set $C_i$ consists of $N_i = |C_i|$ connections, such that $$\sum_{i=1}^{K} N_i = N.$$

Each subset of connections, $C_i$, is protected independent of all other subsets.

The scheme presented in this section is designed to protect against a single link failure. That is, when a link fails, recovery of the data lost due to failures will take place, and the failed link will be repaired before another link fails.

When a link carrying active circuits fails, the tail node of the link will receive empty data units, which can be regarded as zero data units.

It should be pointed out that all addition operations (+) in this section are modulo-2 additions, i.e., Exclusive-OR (XOR) operations.

1.4 Generalized 1+N Protection

In this section we introduce the Generalized 1+N Protection for guaranteed protection against single link failures. We first illustrate the basic principles of this scheme using an example, and then present the general scheme, including the operation at different nodes in the network.

A. Basic Principles

Figure 2:
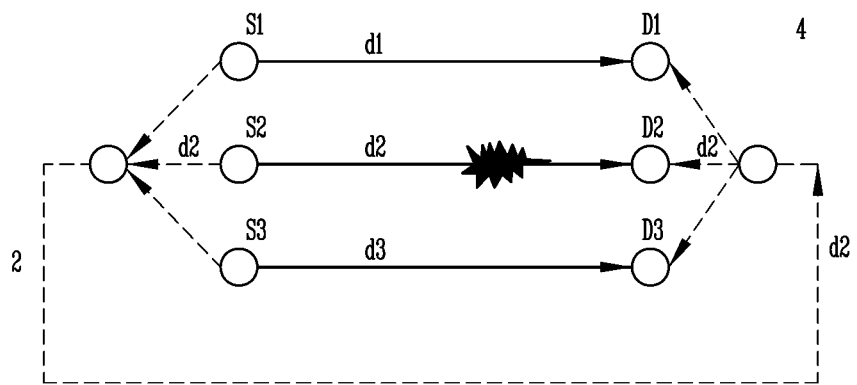
FIG. 2 is a diagram illustrating 1:N protection showing how a protection path is used with path 2 (between $S_2$ and $D_2$) fails.
Figure 3A:
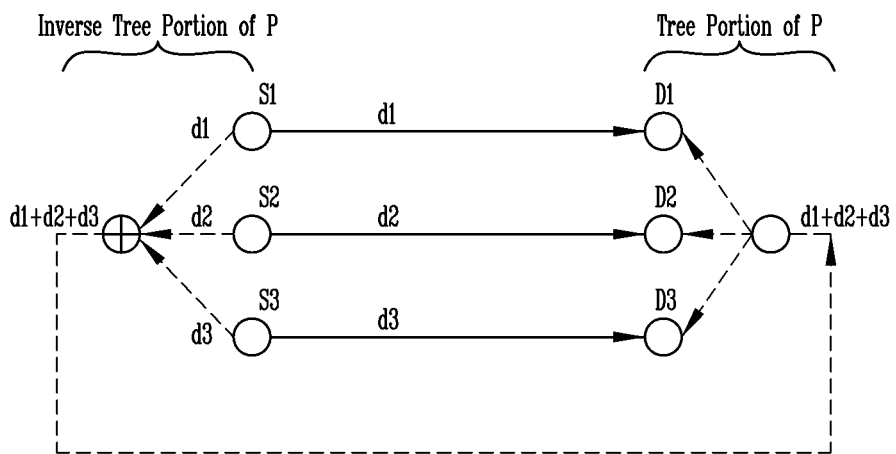
FIG. 3A-3C provides a diagrams illustrating the concepts of generalized 1+N protection, including (a) the primary protection circuit; (b) the secondary protection circuit; (c) both protection circuits providing data recovery from a failure of path $W_2$.
Figure 3B:
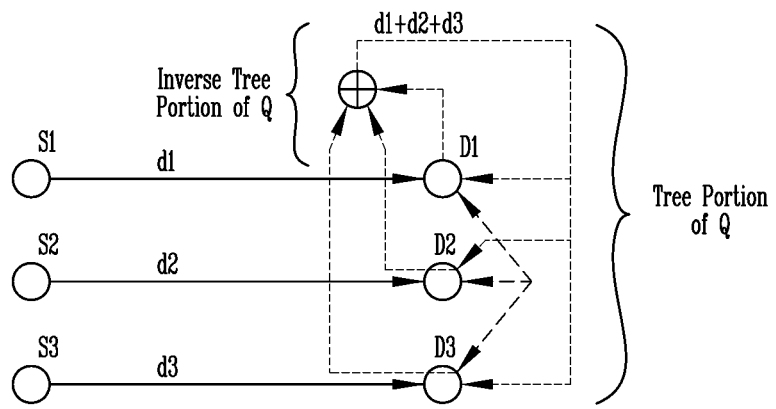
Figure 3C:
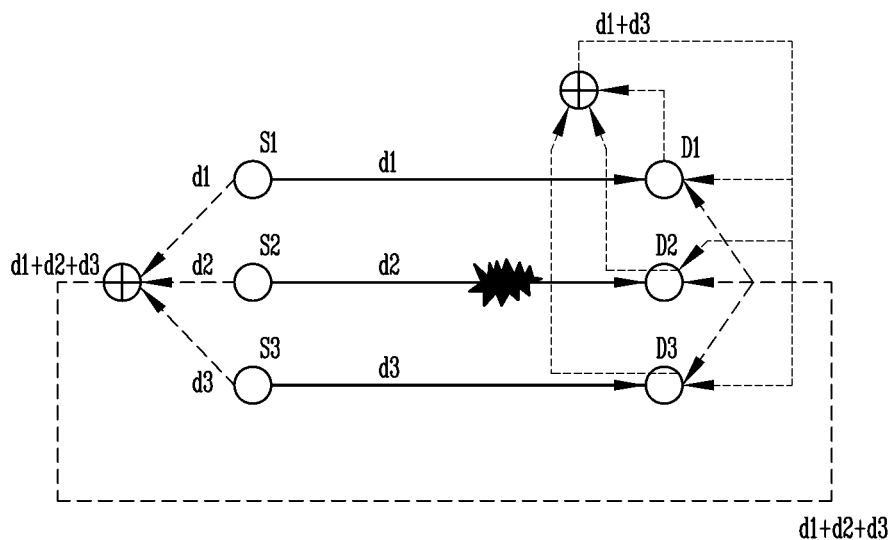

In 1:N protection, a backup path is used to protect one of N link disjoint working paths if one working path fails. As shown in the example in FIG. 2, one protection path is used to protect three working paths. If working path 2 fails, the failure must be detected, and then the path 2 signal can be routed on the protection path. Our objective is to avoid the operations of failure detection, which is performed by the management plane, and rerouting, which is done by the control plane, and allow all sources to transmit backup copies to their respective destinations, simultaneously and on the same protection circuit. However, signals from the N connections cannot be transmitted simultaneously on the protection path shown in FIG. 2 since this will result in contention and collisions. Therefore, the signals are transmitted on the protection path, after being linearly combined using network coding. For example, the signals are added using addition on GF(2), i.e., XORed, as shown in FIG. 3(a). We refer to this protection path as the primary protection circuit. However, when a working path fails, the sum of the signals, which is received on the primary protection circuit, is not sufficient to recover the signal transmitted on the failed working path. For example, in FIG. 3(a), when working path 2 fails, node $D_2$, which is the receiver at the end of path 2, receives $d_1+d_2+d_3$ on the primary protection circuit, where the sum is modulo-2. Node $D_2$ cannot recover $d_2$ from this sum. We solve this problem by having all received signals added at the receiver side, and delivered to all receivers on a second protection circuit, that we refer to as the secondary protection circuit (see FIG. 3(b)). These two signals can be used to recover the signal transmitted on the failed path. In the example of FIG. 3(c), which includes both primary and secondary protection circuits, when working path 2 fails, then $D_2$ receives:

$d_1+d_2+d_3$ on the primary protection circuit, and $d_1+d_3$ on the secondary protection circuit.

These two sums are also added by $D_2$ to recover the lost signal, $d_2$.

B. 1+N Protection Against a Single Failure

In this section we describe the design procedure for generalized 1+N protection against single failures. As stated above, all addition operations will be modulo-2 additions.

For each subset of connections, $C_i$, that are to be protected together, three types of circuits are provisioned:

A total of $N_i$ link disjoint working paths are provisioned to carry the signals directly from source $S_j$ to destination $D_j$, for all connections $c_j \in C_i$. The working path for connection $c_j$ is denoted by $W_j$. Each path has a bandwidth B, and data units are transmitted from $S_j$ to $D_j$ in rounds, i.e., data unit $d_j^{(n)}$ in round n.

A primary protection circuit, $P_i$, is provisioned for all connections in $C_i$, and is used to deliver the sum of all data units, $d_j$, transmitted by the sources, $S_j$, where $c_j \in C_i$, to all receivers, $D_j$ in $C_i$. $P_i$ is link disjoint from the working paths in $C_i$. $P_i$ consists of $N_i$ shared multicast trees from each source, $S_j$ in $C_i$ to all destinations $D_k$ in $C_i$. The sharing of the multicast trees implies that when m trees share a link, the bandwidth required on that link is still B, and not m·B. This is because the m data units to be transmitted on the shared link are added together before transmission, and only the sum is transmitted. This means that $P_i$ can be realized as a Steiner Tree.

The primary protection circuit, $P_i$, is therefore used to deliver the following to all nodes $D_j$, $c_j \in C_i$, where the sum is modulo-2.

$$\sum_{c_l \in C_i} d_l \tag{1.2}$$

The example of FIG. 3(a) shows an implementation of $P_i$ as an inverse tree connected to a tree (this implementation of shared multicast trees may not be optimal, but is shown here for the sake of example only). The inverse tree is used to collect the signals from all sources $S_j$ in $C_i$, which is connected to a tree that delivers the sum of these signals to the destinations $D_j$ in $C_i$. At every merging point on the inverse tree, data units transmitted by $S_j$ are added, and are transmitted on the outgoing link. At every branching point on the tree, received sums of data units are transmitted on all outgoing links to all nodes $D_j$, $c_j \in C_i$.

There is also a secondary protection circuit for $C_i$, which we refer to as $Q_i$, which is also implemented as shared multicast trees from each destination, $D_j$, to all destinations in $C_i$ including $D_j$ itself, and can be also realized as a Steiner Tree. This circuit collects data units received by $D_j$ nodes, and sums these data units using modulo-2 addition and delivers the sum to all destinations. While $Q_i$ needs to be link disjoint from all working paths in $C_i$, it need not be link disjoint from $P_i$. Since $Q_i$ delivers the sum of received signals to all receiver nodes in $C_i$ if, $W_k$, the working path of connection $c_k \in C_i$, fails, then the signal delivered on $Q_i$ to $D_j$ for $c_j \in C_i$ will be $$\sum_{c_j \in C_i, c_j \neq c_k} d_j \tag{1.3}$$

In this case, node k can recover $d_k$ by adding equations (1.2) and (1.3). The example in FIG. 3(c) shows an implementation of $Q_i$ which also has the form of an inverse tree connected to a tree, and collects and adds the received signals from $D_j$ in $C_i$, and delivers this sum to the $D_j$ nodes in $C_i$. Again, this may not be an optimal implementation of $Q_i$, but is only shown for the sake of exposition.

On all three types of circuits above, data units are transmitted in rounds, such that only data units generated in round n are added together on $P_i$ and $Q_i$. As mentioned above, the data unit transmitted from node $S_j$ to node $D_j$ in round n will be denoted by $d_j^{(n)}$.

Below, we describe the operations performed by all nodes, the source, $S_j$, the destination, $D_j$, and intermediate nodes on the primary protection circuit $P_j$ and secondary protection circuit, $Q_i$.

Role of Node $S_j$ of Connection $c_j \epsilon C_i$:

Node $S_j$ will take the following actions:

Transmit data unit $d_j^{(n)}$ on the working path $W_j$ to $D_j$ in round n.

Add $d_j^{(n)}$ to the round n data received on the incoming link from the primary protection circuit, $P_i$ if any, and transmit on the outgoing link(s) of the same protection circuit, $P_i$.

Note that this step is necessary since outgoing links of the tree rooted at $S_j$ may be shared by another tree rooted at another node, $S_k$ in $C_i$. A special case can be the implementation of shared trees by a single path that goes through all $S_j$ nodes in $C_i$ and then through all $D_j$ nodes in $C_i$ also.

Notice that the $S_j$ nodes will have to be synchronized to transmit data units in the same round. Synchronization can be relaxed, and implemented by buffering at one or more nodes. That is, a node that has to perform an addition operation on a number of data units in round n before transmitting their sum, will have to buffer received data units until all data units are available.

Role of Node $D_j$ of Connection $c_j \epsilon C_i$

Before describing the operations performed by node $D_j$, we need to identify two types of incoming links on the $Q_i$ circuit. Some incoming links will be part of the data collection circuit in the shared multicast trees, and these are referred to as collector links. These links will not be carrying the sum of all $d_k^{(n)}$, for all $c_k \epsilon C_i$. Other links will be part of the data delivery circuit in the shared multicast trees, and these will be called delivery links. These are links which carry $\Sigma c_k \epsilon C_i d_k^{(n)}$. For example, in FIG. 4A the $Q_i$ circuit is implemented as a non-simple path. Span $(D_1, D_2)$ carries two links as part of the $Q_i$ circuit, and so does link $(D_2, D_3)$. However, for each such pair of links one is a collector link and the other is a delivery link. Links a and b are collector links, while links c, d and e are delivery links. It should be also noted that the $Q_i$ circuit can be implemented using a fewer number of links, as shown in FIGS. 4B and 4C, depending on link and bandwidth availability. In this case, node $D_3$ which determines that the combination that it outputs contains all data units in the protected group, need not receive this combination again.

Based on the above definitions, we now define the actions taken by node $D_j$:

If node $D_j$ has any outgoing links on the $P_i$ circuit, then any data unit received on an incoming link on $P_i$ will be transmitted on all outgoing links on the $P_i$ circuit.

Node $D_j$ will receive data transmitted on the working path $W_j$ from $S_j$ in round n, $d_j^{(n)}$. Call this received data unit $d_j^{(n)'}$. In the case of failure of $W_j$, $d_j^{(n)}$ will not be received, and therefore $d_j^{(n)'}$ will be taken as zero for the purpose of recovery of the lost $d_j^{(n)}$.

Node $D_j$ will add $d_j^{(n)'}$ to the round n data units received on the incoming collector links from the secondary protection circuit, $Q_i$, if any. If there are outgoing collector links, the sum will be transmitted on them. If there are no outgoing collector links of the same protection circuit, $Q_i$, but there are outgoing delivery links, the sum will be transmitted on them.

Figure 4A:
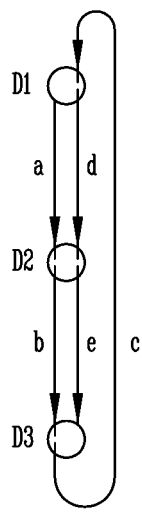
FIG. 4 is a diagram showing an example of collector and delivery links.
Figure 4B:
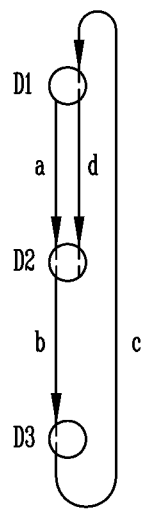
Figure 4C:
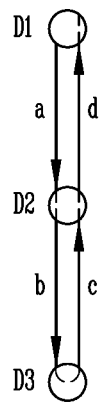

In the example of FIG. 4A-4C, node $D_2$ receives $d_1^{(n)'}$ on incoming collector link a, adds $d_2^{(n)'}$ using modulo-2 addition, and since the outgoing link b is a collector link, the sum is transmitted on b. However, for node $D_3$, $d_3^{(n)'}$ will be added to the $d_1^{(n)'}+d_2^{(n)'}$ received on incoming collector link b, and the sum will be transmitted on the outgoing delivery link c, since there are no outgoing collector links.

Round n data units received by node $D_j$ on incoming delivery links of $Q_i$ will be added to the round n data units received on the $P_i$ circuit. Call this sum $d_j^{(n)''}$. The outcome will depend on $d_j^{(n)'}$:

In case $d_j^{(n)'}=0$, i.e., the $W_j$ working path has failed, then $d_j^{(n)'}=d_j^{(n)}$.

In case $d_j^{(n)'} \neq 0$, i.e., the $W_j$ working path has not failed, then $d_j^{(n)''}$ should be 0 in the case of no other failures. However, if $d_j^{(n)''} \neq 0$, this means that either a failure on another working path, or on a protection path has taken place, and node $D_j$ should ignore this signal.

Role of Intermediate Nodes on $P_i$ and $Q_i$

Intermediate nodes on $P_i$ and $Q_i$ may either have one, or more incoming links on the same circuit. Therefore, intermediate nodes will add received data units on all incoming links in the same round, $d_j^{(n)}$, and forward them on all outgoing links.

C. Special Cases

In this section we present a number of special cases that require some modifications to the general strategies, and can even reduce the amount of required resources.

1) Connections with a Common Destination and Link Disjoint Paths:

If a set of connections which are jointly protected have the same destination, then the secondary protection path is not needed. This is true since if the number of jointly protected connections is m, then if one of the working paths fails, the destination will receive exactly m signals which correspond to linearly independent equations, one of which arrives on the primary protection circuit. Using these independent equations, data units transmitted on the failed working path can be recovered.

The above scheme can be adopted without change, except for doing away with the secondary protection circuit. This requires that there be m link disjoint paths which are used as working paths. In addition, the shared trees of the primary protection circuit should be link disjoint with all those m paths.

Figure 5:
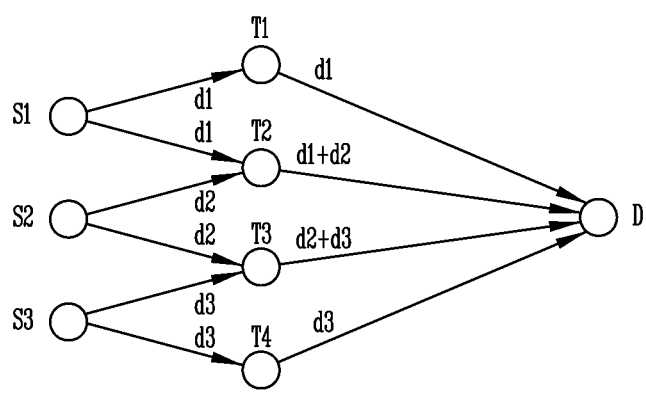
FIG. 5 is a diagram illustrating a special case of many-to-one service, in which there is no explicit protection circuit FIG. 6A-6B provides diagrams illustrating special cases in which the primary protection circuit, through the destinations is a simple path.

2) Connections with a Common Destination but Insufficient Link Disjoint Paths:

While this case has some similarities to the first special case above, it has some important differences. The case is illustrated by the example in FIG. 5. In this case, there are three link disjoint paths from the sources $S_1$, $S_2$ and $S_3$ to the common destination D. However, a link disjoint primary protection circuit which is link disjoint from all working paths cannot be constructed for all three connections. In this case, network coding protection can still be provided, and this is done, as shown in FIG. 5, by having intermediate nodes $T_1$, $T_2$, $T_3$ and $T_4$ add all incoming signals belonging to the group of connections that are jointly protected. As shown in FIG. 5, $T_2$ will form $d_1+d_2$ while node $T_3$ will form $d_2+d_3$. No secondary protection circuit is required in this case either. This case is not necessarily less expensive than the first case, as the exact cost depends very much on the network topology.

The conditions for this case to exist can be derived in terms of the min-cut max-flow requirements. Assuming that each span has a capacity of one unit, then the following condition must hold for this case to be used:

If there are m jointly protected connections then for any subset of k connections out of this set, for $1 \le k \le m$, the max-flow from all sources to the common destination is k+1. This case can be treated using a pre-processing phase which is shown in Algorithm 1.

---
Algorithm 1: Pre-Processing Algorithm
---

Input: $W_j \; \forall_j \; C_i, \; \forall_i$
Output: $P_i \; \forall_i$
U = S {A set that contains the Unprotected sources}
P = φ {A set that contains the Protected sources}
SC = Find the shortest path tree.
While |P| < |S| do
    Pick and remove a source Sj from U
    Find |P|+1 edge-disjoint s-t paths from $S_j$ and the sources in P,
        using only the edges in SC, and direct the edges on these
        paths towards the sink.
    Find an extra path $p_j$ from the sink to $S_j$ using Bhandari's algorithm.
    Add Sj to P
    Add $p_j$ to SC
end while

---

3) *Primary Protection Circuit Through Destinations is a Simple Path:*

Figure 6A:
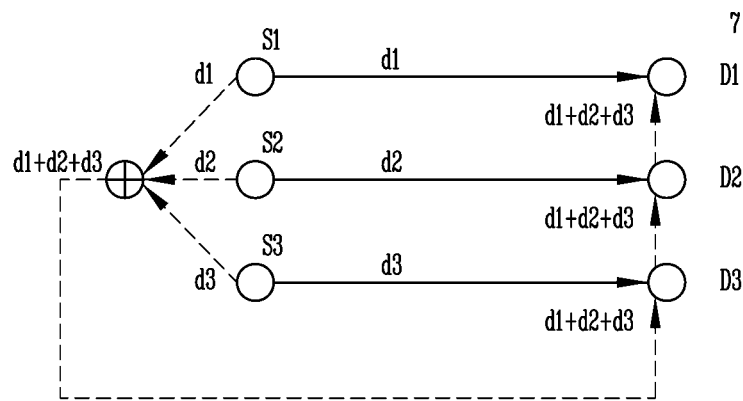
Figure 6B:
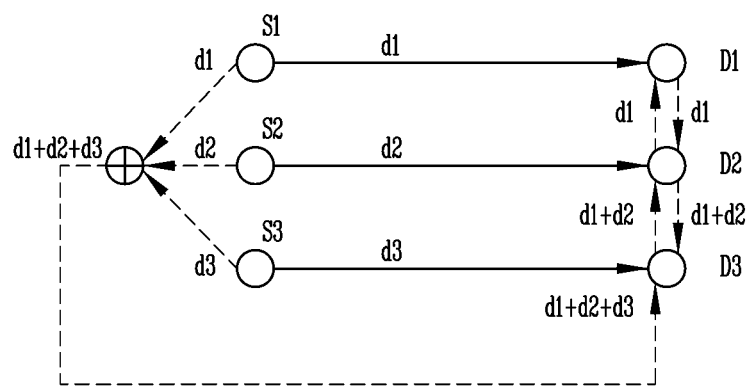

This case is illustrated in the example in FIG. 6(a). This case can be considered a special case of the strategy previously proposed. To deal with this case, the $Q_i$ circuit can be constructed as a simple path through the destination nodes, $D_j$ in $C_i$, but in the opposite direction of the $P_i$ path. In this case, each destination node $D_j$ removes its $d_j$ data unit from the signal on $P_i$ by adding the $d_j$ received on $W_j$ to the signal on $P_i$. Also, $D_j$ adds $d_j$ to $Q_i$. This is shown in the example of FIG. 6(b). Data unit recovery can be achieved by adding the signals received on $P_i$ and $Q_i$. For example, if $W_2$ in FIG. 6(b) fails, then $D_2$ adds the signals received on $P_i$ and $Q_i$ to recover $d_2$.

This case can be handled using the post-processing algorithm shown in Algorithm 2. In this case, once it is recognized that the primary protection circuit portion through the destinations is a simple path, the secondary protection circuit can be constructed accordingly, and the one found by the design algorithm can be discarded. For this to work properly, we give priority to minimizing the working and primary protection circuits over the secondary protection circuit.

---
Algorithm 2: Post-Processing Algorithm
---

Input: $W_j \; \forall_j \; C_i, P_i, Q_i \; \forall_i$
Output: Modified $Q_i \; \forall_i$
if Portion of $P_i$ going through destinations is a simple path then
    replace $Q_i$ by a simple path going through destinations in the
        opposite direction of $P_i$;
else
    if $Q_i$ is a non-simple path through destinations
    then
        reroute $Q_i$ such that last node to add data unit need not receive
        this information;

---

4) *Secondary Protection Circuit is a Path:*

An example of this case shown in FIG. 4(a). This case can be reduced to cases similar to those in FIGS. 4(b) and 4(c), since the node that computes the combination that contains all data units need not receive this combination again (node $D_3$ in the example of FIG. 4). This is done in the post-processing algorithm shown in Algorithm 2.

D. *Error Control Under No Failure Scenarios*

The above strategy, not only protects against single link failures, but can also be used as a method of error recovery in the absence of failures. In this case, a data unit hit by errors on a working path can be recovered using the primary and secondary protection circuits.

The strategy is similar to recovery of data due to failures. However, when the data unit received by node $D_j$ in $C_i$, $d_j^{(n)'}$, is detected to contain an error through checksum calculation, $d_j^{(n)'}$ is taken as a zero, and then combined on $Q_i$. Following the above procedure, data unit $d_j^{(n)}$ can be recovered by node $D_j$.

1.5 Conclusions

Therefore a generalized strategy for 1+N protection has been disclosed. The strategy uses network coding to protect a set of unidirectional connections, which are provisioned using link disjoint paths. Network coding is used on a primary protection circuit to combine signals transmitted by the sources, and is also used on a secondary protection circuit to combine signals received by the destinations. The linear combinations are based on simple modulo-2 additions, or the XOR operation. The availability of these two combinations allows the destination of a failed working path to recover the lost data units, with very little, or no intervention from either the management or control planes. An optimal strategy for provisioning the connections as well as the protection circuits was introduced. Numerical examples based on this optimal formulation were introduced and showed that the resources consumed by this strategy are significantly less than those needed by 1+1 strategies.

The advantages of this scheme is the sharing of protection resources in a manner that enables the recovery of lost data units at the speed of 1+1 protection, but using protection resources at the level of 1:N protection. This sharing was enabled through the use of network coding.

The methodology may be used in communication networks, including enterprise networks, backbone networks, and wireless mesh networks. The methodology may be implemented in network equipment to provide 1+N protection. The methodology may be used by network service providers to assist in providing non-stop service in their networks.

2. A Modified Generalized 1+N Protection

In this section we modify the Generalized 1+N protection scheme described in section 1. The modification consists of two steps:

1. The secondary protection circuit, $Q_i$, is not included, and therefore a saving in the protection resources is realized.
2. One of the network nodes, which is not necessarily one of the transmitters or receivers of the protected connections, must be involved in the protection process. This requires linear combinations of transmitted and received data to be sent to, and processed by this node. This may, or may not add slightly to the failure recovery delay, and may require involvement of network nodes.

The above modification can be employed in order to further reduce the resources used for protection, if the functionality of the special node mentioned above can be provisioned in the network.

2.1 *Modified 1+N Protection of Unidirectional Connections Against a Single Failure*

Figure 7:
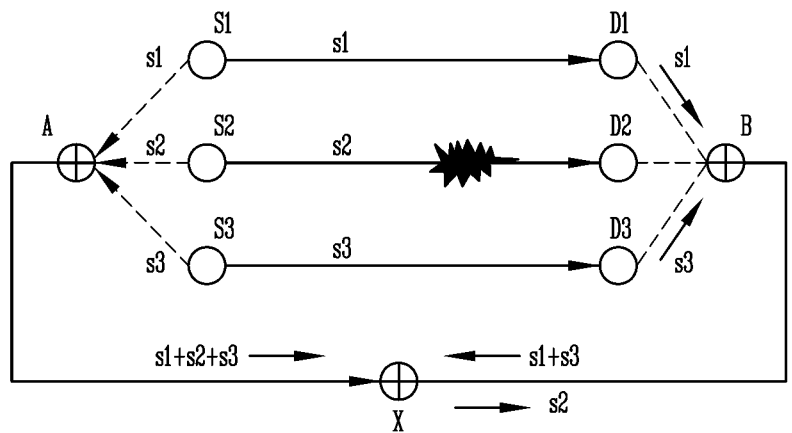
FIG. 7 shows a diagram that illustrates the concepts of the modified Generalized 1+N protection for unidirectional connections.

In a network that supports unidirectional connections, such as the network in the example of FIG. 7 in which we show three unidirectional connections, one protection circuit is used to protect the three working paths. Each of the three connections is from node $S_j$ to node $D_j$, where j=1, 2, 3. Node $S_j$ sends data unit $s_j$ to node $D_j$. At the same time, node $S_j$ sends its $s_j$ data unit to one (or more) node(s) in the network (node A in the figure), where all $s_j$ data units are linearly combined by performing modulo-2 addition. The sum is delivered to another node, X, in the network. Node $D_j$ will also send its received data unit to node B in the network, where these data units will also be linearly combined using the modulo-2 addition, and the sum is then delivered to the same node X (nodes A, B and X may be the same or different nodes in the network). Such a node, X, always exists in the network, since the minimum cost protection circuit is always a tree. At node X, the linear combinations received from the $S_j$ and $D_j$ nodes are combined, also using modulo-2 addition, and this sum is then delivered to the $D_j$ nodes. In the absence of failures, this sum will be 0. However, when a failure takes place, e.g., on the connection from node $S_2$ to node $D_2$ in the figure, $s_2$ will not be received by $D_2$, i.e., received $s_2$=0, and the sum obtained at node B will be $s_1 + s_3$. Therefore, the total sum at X will be the missing data unit, $s_2$, which will be delivered to $D_2$.

In section 1, two protection circuits were introduced: a primary protection circuit that delivers the sum of all transmitted data units from all $S_j$ in $C_i$ nodes to all $D_k$ in $C_i$ and a secondary protection circuit on which the data units received by all $D_k$ in $C_i$ are linearly combined, and the linear combination is delivered back to all receivers. The receivers are then responsible for recovering the lost data. This also makes it possible for some receivers to eavesdrop on data intended to other receivers. The strategy proposed in this section does away with the secondary protection circuit, by introducing the functionality of node X. This results in saving expensive protection resources. Moreover, as will be shown below, under bidirectional communication, receivers will not be able to eavesdrop on other connections, since the received data units will be linear combinations of data units unknown to those receivers. That is, data units encrypt each other. However, this requires that a node in the network be equipped with the functionality of node X.

The general strategy for protecting bidirectional connections.

2.2 1+N Protection of Bidirectional Connections Against a Single Link Failure

Figure 8:
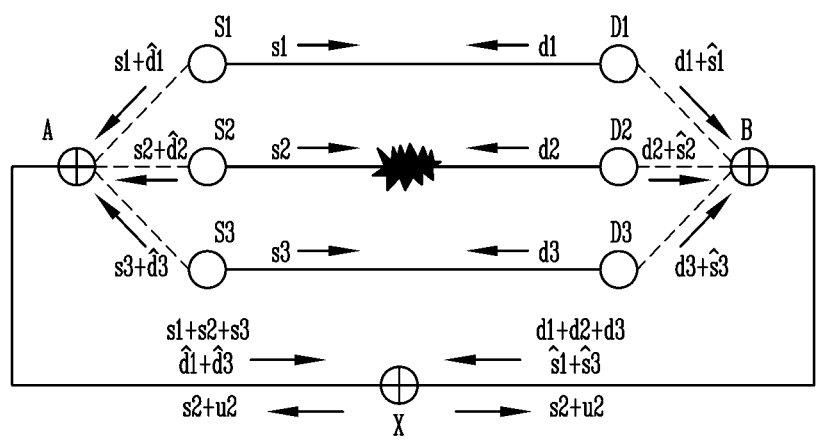
FIG. 8 is a diagram that illustrates the concepts of the modified Generalized 1+N protection for bidirectional connections.

The example in FIG. 8 is a generalization of that in FIG. 7, and is used to illustrate the procedure. Similar to the above all addition operations will be modulo-2 additions, but can be extended to other fields.

For each subset of connections, $C_i$, that are to be protected together, two types of circuits are provisioned:

A total of Ni link disjoint working paths are provisioned to carry the data units directly between source $S_j$ and destination $D_j$ for all connections $c_j$ in $C_i$. The working path for connection $c_j$ is denoted by $W_j$. Each path has a bandwidth B, and data unit $s^{(n)}_j$ is transmitted from Sj to $D_j$ in round n, while data unit $d^{(n)}_j$ is transmitted from $D_j$ to $S_j$ in the same round.

A protection circuit, $P_i$, is provisioned for all connections in $C_i$. The minimal cost protection circuit takes the form of a tree. Therefore, the protection circuit has at least one bridge node, and let us refer to one such bridge node as $X_i$. Each node $S_j$ transmits the sum $s^{(n)}_j + d^{(n)}_j$ on $P_i$, while node $D_j$ transmits the sum $d^{(n)}_j + s^{(n)}_j$ on $P_i$. The $P_i$ circuit is used to deliver the sum of data units $\Sigma_{j,j\ in\ Ci}\ s^{(n)}_j + d^{(n)}_j$ from $S_j$ nodes to $X_i$, and is also used to deliver the sum of data units $\Sigma_{j,j\ in\ Ci}\ d^{(n)}_j + s^{(n)}_j$ from $D_j$ nodes, also to $X_i$. $P_i$ is link disjoint from the working paths in $C_i$.

The shape of the minimal cost $P_i$ circuit is always a tree. This means that there is always a node on this tree which can function as the node $X_i$ described above.

The undirected tree, $P_i$, is then treated as two directed trees: one from the leaf nodes towards $X_i$ using the shortest distance metric, e.g., number of hops, and the second tree is rooted at $X_i$, and is directed from $X_i$ towards to the leaf nodes, also using the shortest distance metric. The two trees are identical, except that directions of the edges are reversed. We now describe the role of the different nodes in providing 1+N protection:

Role of Node $S_j$ of Connection $c_j$ in $C_i$:
Node $S_j$ will take the following actions:
Transmit data unit $s^{(n)}_j$ on the working path $W_j$ to $D_j$ in round n.
When $d^{(n)}_j$ is received on $W_j$, form $s^{(n)}_j + d^{(n)}_j$ and transmit this sum on the outgoing link of $P_i$.
If received $d^{(n)}_j$=0, then add $s^{(n)}_j$ to the data received on the incoming link of $P_i$ corresponding to round n in order to recover $d^{(n)}_j$; otherwise, ignore the data received on $P_i$.

Role of Node $D_j$ of Connection $c_j$ in $C_i$:
Node $D_j$ will take actions very similar to those taken by $S_j$, except that $s^{(n)}_j$ and $d^{(n)}_j$ are interchanged:
Transmit data unit $d^{(n)}_j$ on the working path $W_j$ to $S_j$ in round n.
When $s^{(n)}_j$ is received on $W_j$, form $d^{(n)}_j + s^{(n)}_j$ and transmit this sum on the outgoing link of $P_i$.
If $s^{(n)}_j$=0, then add $d^{(n)}_j$ to the data received on the incoming link of $P_i$ corresponding to round n in order to recover $s^{(n)}_j$; otherwise, ignore the data received on $P_i$.

Role of Intermediate Nodes on $P_i$:
All intermediate nodes on $P_i$, except for $X_i$, e.g., nodes A and B in FIG. 8, will take the following actions:
For data received on incoming links from the leaf nodes, and going towards $X_i$, add all data units (possibly linear combinations) belonging to round n using modulo-2 addition, and forward the sum towards $X_i$.
For data received on an incoming link from $X_i$ and going towards the leaf nodes, duplicate the data and broadcast on all outgoing links.

Note that nodes $S_j$ and $D_j$ in $C_j$ may also act as intermediate nodes, e.g., if $P_i$ is realized as a path. In this case, each such node can be represented by two virtual nodes, e.g., node $S_j$ can be represented by $S'_j$ and $S''_j$, which are connected by a bidirectional edge:
Node $S'_j$ is connected to $W_j$, and acts like $S_j$ above, and
Node $S''_j$ acts like the intermediate node described above.

Role of Node $X_i$ on $P_i$:
For linear combinations belonging to round n and received on incoming links, add these combinations using modulo-2 addition.
The sum obtained in the first step is broadcast on all outgoing links from $X_i$ towards the leaf nodes.

This process is illustrated using the example in FIG. 8, when the connection between $S_2$ and $D_2$ fails. In this case, received $s_2$=received $d_2$=0, and summing the linear combinations arriving at X yields $s_2 + d_2$. This sum is broadcast back to end nodes of all connections. Nodes $S_2$ and $D_2$ can recover $d_2$ and $S_2$ by adding $S_2$ and $d_2$, respectively. Notice that the end nodes of other connections cannot recover either of these data units, which makes this method secure, as far as the end nodes are concerned.

3. Network Protection Strategies Against a Single Link Failure in Optical Networks In this section we develop network protection strategies against a single link failure in optical networks. The motivation behind this work is the fact that 70 percent out of all available links in an optical network suffers from a single link failure. In the proposed protection strategies, denoted NPS-I and NPS-II, we deploy network coding and reduced capacity on the working paths to provide a backup protection path that will carry encoded data from all sources. In addition, we provide implementation aspects and how to deploy the proposed strategies in case of an optical network with n disjoint working paths.

3.1 Introduction

One of the main services of operation networks that must be deployed efficiently is reliability. In order to deploy a reliable networking strategy, one needs to protect the transmitted signals over unreliable links. Link failures are common problems that might happen frequently in single and multiple operating communication circuits. In network survivability and network resilience, one needs to design efficient strategies to overcome this dilemma. Optical network survivability techniques are classified as pre-designed protection and dynamic restoration. A. Markopoulou, S. Iannaccone, G. Bhattacharyya, C. N. Chuah, and C. Diot, Characterization of failures in an ip backbone network, In *Proc. of IEEE INFOCOM '04*, March 2004; A. K. Somani, *Survivability and traffic grooming in Optical Networks*, Cambridge Press, 2006; D. Zhou and S. Subramaniam, Survivability in optical networks, *IEEE network,* 14:16-23, November/December 2000. The approach of using pre-designed protections aims to reserve enough bandwidth such that when a failure occurs, backup paths are used to reroute the transmission and be able to recover the data. Examples of this type are 1-1 and 1-N protections. A. E. Kamal, 1+N protection against multiple faults in mesh networks, In *Proc. of the IEEE International Conference on Communications (ICC)*, 2007; A. E. Kamal, A generalized strategy for 1+N protection, In *Proc. of the IEEE International Conference on Communications (ICC)*, 2008. In dynamic restoration reactive strategies, capacity is not reserved. However, when the failure occurs, dynamic recovery is used to recover the data transmitted in the links that are suffered from failures. This technique does not need preserved resources or provisioning extra paths that work in cases of failure's occurrence. In our work we will provide several strategies of dynamic restoration based on network coding and reduced distributed fairness capacities.

Network coding is a powerful tool that has been recently used to increase the throughput, capacity, security, and performance of communication networks. Information theoretic aspects of network coding have been investigated in E. Soljanin and C. Fragouli, Network coding information flow perspective, 2007; R. W. Yeung, S.-Y. R. Li, N. Cai, and Z. Zhang. *Network Coding Theory*, Now Publishers Inc., 2006; R. Ahlswede, N. Cai, S.-Y. R. Li, and R. W. Yeung, Network information flow, *IEEE Trans. Inform, Theory,* 46:1204-1216, 2000. Network coding allows the intermediate nodes not only to forward packets using network scheduling algorithms, but also encode/decode them using algebraic primitive operations, see: R. Ahlswede, N. Cai, S.-Y. R. Li, and R. W. Yeung, Network information flow, *IEEE Trans. Inform. Theory,* 46:1204-1216, 2000; C. Fragouli, J. Le Boudec, and J. Widmer, Network coding: An instant primer, *ACM SIGCOMM Computer Communication Review,* 36(1):63-68, 2006; E. Soljanin and C. Fragouli, Network coding information flow perspective, 2007; R. W. Yeung, S.-Y. R. Li, N. Cai, and Z. Zhang, *Network Coding Theory*, Now Publishers Inc., 2006, and references therein. Network coding is used to maximize the throughput: R. Ahlswede, N. Cai, S.-Y. R. Li, and R. W. Yeung, Network information flow, *IEEE Trans. Inform, Theory,* 46:1204-1216, 2000; S. Jaggi, P. Sanders, A. Chou, M. Errfos, S. Egner, K. Jain, and L. Tolhuizen, Polynomial time algorithms for multicast network code construction, In *IEEE Tran. Inform. Theory,* 2003; R. Koetter and M. Medard, An algebraic approach to network coding, *IEEE/ACM transactions on networking,* 2003, network capacity: A. Ramamoorthy, J. Shi, and R. D. Wesel, On the capacity of network coding for random networks, *IEEE Trans. Info. Theory,* 51(8):2878-2885, August 2005; S. A. Aly, V. Kapoor, J. Meng, and A. Klappenecker, Bounds on the network coding capacity for wireless random networks, In *Third Workshop on Network Coding, Theory, and Applications, NetCod'07*, January 2007; Z. Kong, S. A. Aly, E. Soljanin, E. Yan, and A. Klappenecker, Network coding capacity of random wireless networks under a signal-to-interference-and-noise model, *Proceedings of the 45th Allerton Conference on Communication, Control, and Computing*, Urbana, Ill., September 2007. arXiv:cs-IT/0708.3070v. Also, it is robust against packet losses and network failures: T. Ho, R. Koetter, M. Medard, D. Karger, and M. Effros, The benefits of coding over routing in a randomized setting, In *Proc. of the IEEE International Symposium on Information Theory (ISIT03)*, page 442, Yokohama, Japan, June 2003; D. S. Lun, N. Ranakar, R. Koetter, M. Medard, E. Ahmed, and H. Lee, Achieving minimum-cost multicast: A decentralized approach based on network coding, In *In Proc. the 24th IEEE INFOCOM*, volume 3, pages 1607-1617, March 2005, and it enhances network security and protection: S. Jaggi, M. Langberg, S. Katti, T. Ho, D. Katabi, and M. Medard, Resilient network coding in the presence of byzantine adversaries, In *Proc. IEEE INFOCOM,* 2007; L. Lima, M. Medard, and J. Barrows, Random linear network coding: A free cipher, In *ISIT 06*, 2006. It is believed that network coding will be deployed in all relay nodes and network operations.

Network protection against a single link failure (SLF) using adding one extra path has been introduced in: A. E. Kamal, 1+N protection in optical mesh networks using network coding on p-cycles, In *Proc. of the IEEE Globecom,* 2006; A. E. Kamal, 1+N protection against multiple faults in mesh networks, In *Proc. of the IEEE International Conference on Communications (ICC)*, 2007; A. E. Kamal, Gmpls-based hybrid 1+N link protection over p-cycles: Design and performance, In *Proc. of IEEE Globecom,* 2007. The source nodes are able to combine their data into a single extra path (backup protection path) that is used to protect all signals on the working paths carrying data from all sources. Also, protection against multiple link failures has been presented in: A. E. Kamal, A generalized strategy for 1+N protection, In *Proc. of the IEEE International Conference on Communications (ICC)*, 2008; S. Jaggi, M. Langberg, S. Katti, T. Ho, D. Katabi, and M. Medard, Resilient network coding in the presence of byzantine adversaries, In *Proc. IEEE INFOCOM,* 2007; where m extra paths are used. In both cases, p-cycles has been also used for protection against single and multiple link failures. In this model the source nodes are assumed to send their data with a full capacity relaying on the extra paths to protect their data. However, there are situations where extra paths approach might not be applicable, and one needs to design a protection strategy depending only on the available resources.

In this work we will assume that all paths are working and adding extra paths to the available ones is a hard or out of reach task. We apply two network protection strategies called NPS-I and NPS-II, each of which has (n−1)/n normalized network capacity. In these two strategies, we show how the sources achieve the encoding operation and distribute their link's capacities among them for fairness. We assume that one of the working paths will overlap to carry encoded data, therefore, it will act as a protection path.

In this section, we introduce and design a model for network protection against a single link failure in optical networks. In this model, the network capacity will be reduced by partial factor in order to achieve the required protection. Several advantages of NPS-I and NPS-II can be stated as follows.

- The data originated from the sources are protected without adding extra secondary paths. We assume that one of the working paths will act as a protection path carrying encoded data.
- The encoding and decoding operations are achieved online with less computation cost at both the sources and receivers.
- The normalized network capacity is $(n-1)/n$, which is near-optimal in case of using large number of n connection paths.

The rest of this section is organized as follows. In subsections 3.2 and 3.3 we present the network model and problem setup, respectively. The definitions of the normalized capacity, working and protection paths are given. In subsection 3.4 we present a network protection strategy NPS-I against a single link/path failure using an extra dedicated path. In addition in subsection 3.5 we provide the network protection strategy NPS-II which deployed network coding and reduced capacity. The implementation aspects of NPS-I and NPS-II are discussed in subsection 3.6, and finally the section is concluded in subsection 3.7.

3.2 Network Model

Figure 9:
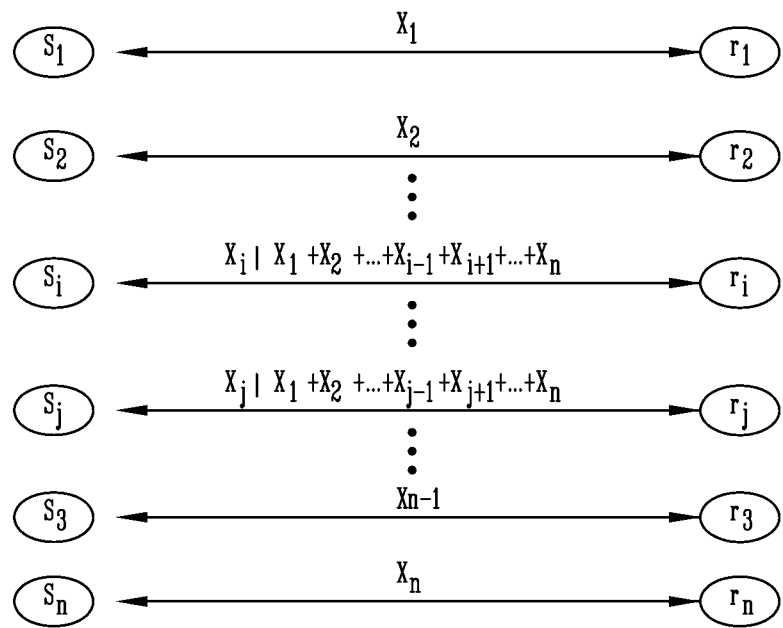
FIG. 9 is a diagram illustrating network protection against a single link failure using reduced capacity and network coding where two links out of n primary links carry encoded data.

The network model can be describe as follows.

i) Let N be a network represented by an abstract graph $G=(V, E)$, where V is the set of nodes and E be set of undirected edges. Let S and R be sets of independent sources and destinations, respectively. The set $V = V \cup S \cup R$ contains the relay nodes, sources, and destinations. Assume for simplicity that $|S|=|R|=n$, hence the set of sources is equal to the set of receivers.

ii) A path (connection) is a set of edges connected together with a starting node (sender) and an ending node (receiver).

iii) The node can be a router, switch, or an end terminal depending on the network model N and the transmission layer.

iv) L is a set of links $L=\{L_1, L_2, \ldots, L_n\}$ carrying the data from the sources to the receivers as shown in FIG. 9. All connections have the same bandwidth, otherwise a connection with high bandwidth can be divided into multiple connections, each of which has a unit capacity. There are exactly n connections.

v) Each sender $s_i \in S$ will transmit its own data $x_i$ to a receiver $r_i$ through a connection $L_i$. Also, $s_i$ will transmit encoded data $$\sum_{i}^{n} x_i$$

to $r_i$ at different time slot if it is assigned to send the encoded data.

vi) The data from all sources are sent in sessions. Each session has a number of time slots n. Hence $t_\delta^\ell$ is a value at round time slot $\ell$ in session $\delta$.

vii) In this model N, we consider only a single link failure, it is sufficient to apply the encoding and decoding operation over a finite field with two elements, we denote it $F_2=\{0, 1\}$.

viii) There are at least two receivers and two senders with at least two disjoint paths, otherwise our model can not be deployed for a single path, in which it can not protect itself.

Figure 10:
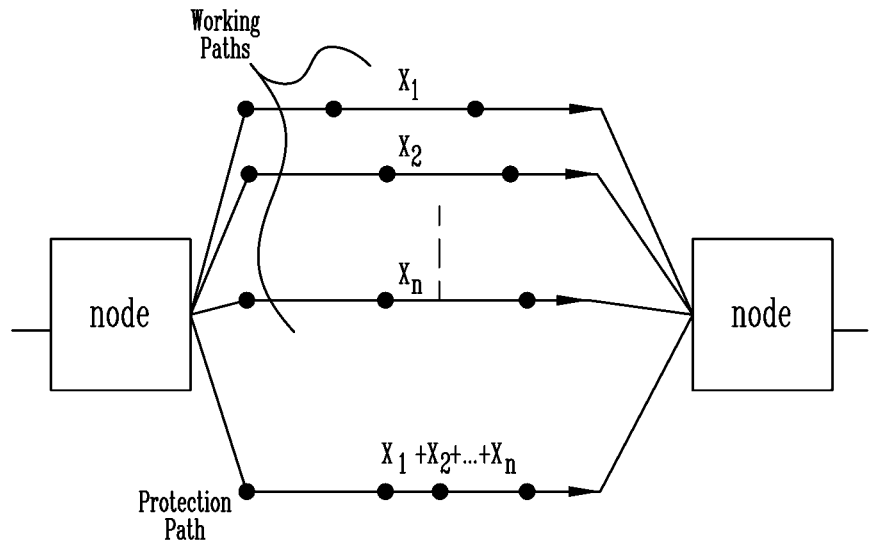
FIG. 10 is a diagram illustrating network protection against a single path failure using reduced capacity and network coding. One path out of n primary paths carries encoded data. The points represent various other relay nodes.

We will define the working and protection paths between two network nodes (switches and routers) in optical networks as shown in FIG. 10.

DEFINITION 3.1

The working paths on a network with n connection paths carry traffic under normal operations. The Protection paths provide an alternate backup path to carry the traffic in case of failures. A protection scheme ensures that data sent from the sources will reach the receivers in case of failure incidences on the working paths.

3.3 Problem Setup and Terminology

We assume that there is a set of n connections that need to be protected with 100 percent guaranteed against a single link failure (SLF). All connections have the same bandwidth, and each link (one hop) with a bandwidth can be a circuit.

Every sender si prepares a packet $packet_{s_i \to r_i}$ sent to the receiver $r_i$. The packet contains the sender's ID, data $x_i^\ell$, a round time for every session $t_\delta^\ell$ for some integers $\delta$ and $\ell$. We have two types of packets:

i) Packets sent without coding, in which the sender does not need to perform any coding operations. For example, in case of packets sent without coding, the sender $s_i$ sends the following packet to the receiver $r_i$.

$$packet_{s_i \to r_i} := (ID_{si}, x_i^\ell, t_\delta^\ell) \qquad (3.1)$$

Packets sent with encoded data, in which the sender needs to send other sender's data. In this case of packets sent with encoded data, the sender $s_i$ sends the following packet to receiver $r_i$:

$$packet_{s_i \to r_i} := \left( ID_{si}, \sum_{j=1, j \neq i}^{n} x_j^\ell, t_\delta^\ell \right) \qquad (3.2)$$

The value $$y_j^\ell = \sum_{j=1, j \neq i}^{n} x_j^\ell$$

is computed by every sender $s_i$, in which it is able to collect the data from all other senders and encode them using the bit-wise operation.

In either case the sender has a full capacity in the connection link $L_i$. We will provide more elaboration in this scenario in subsection 3.6, where implementation aspects will be discussed.

We can define the network capacity in the light of min-cut max-flow information theoretic view: R. Ahlswede, N. Cai, S.-Y. R. Li, and R. W. Yeung, Network information flow, *IEEE Trans. Inform. Theory,* 46:1204-1216, 2000. It can be described as follows.

DEFINITION 3.2

The unit capacity of a connecting path $L_i$ between $s_i$ and $r_i$ is defined by $$c_i = \begin{cases} 1, & L_i \text{ is active;} \\ 0, & \text{otherwise.} \end{cases} \quad (3.3)$$

And the total capacity of N is given by the summation of all path capacities. What we mean by an active path is that the receiver is able to receive signals/messages throughout this path and process them.

Clearly, if all paths are active then the total capacity is n and normalized capacity is 1. If we assume there are n disjoint paths, then, in general, the capacity of the network for the active and failed paths is computed by $$C_N = \frac{1}{n}\sum_{i=1}^{n} c_i. \quad (3.4)$$

There have been several techniques to provide network survivability. Such techniques will add additional resources for the sake of recovery from failures they will also depend on how fast to recover from failures, and how much delay the receiver can tolerate. Hence, network survivability is a multi-objective problem in terms of resource efficiency, operation cost, and agility. Optimizing these objective has taken much attention recently, and has led to design more efficient reliable networks.

3.4 Network Protections Against a SLF Using Extra and Dedicated Paths

Assume we have n connections carrying data from a set of n sources to a set of n receivers. All connections represent disjoint paths, and the sources are independent of each other. The author in A. E. Kamal, 1+N protection in optical mesh networks using network coding on p-cycles, In *Proc. of the IEEE Globecom*, 2006; A. E. Kamal, 1+N protection against multiple faults in mesh networks, In *Proc. of the IEEE International Conference on Communications (ICC)*, 2007 introduced a model for optical network protection against a single link failure using an extra path provisioning. The idea is to establish a new connection from the sources to the receivers using virtual (secondary) source and virtual secondary (receiver). The goal of the secondary source is to collect data from all other sources and encode it using Xored operation.

The extra path that carries the encoded data from all sources is by one cycle. In the encoding operations, every source $s_i$ adds its value, and the cycle starts at source one and ends at source $s_n$. So, the encoded data after performing is the cyclic or extra path is $$X = \sum_{i=1}^{n} x_i.$$

The decoding operations are done at every receiver $r_i$ by adding the data $s_i$ received over the link $L_i$. The node $r_j$ with failed connection $L_j$ will be able to recover the data $x_j$. Assuming all operations are achieved over the binary finite field $F_2$.

Hence we have $$x_j = X - \sum_{i=1,i\neq j}^{n} x_i^t. \quad (3.5)$$

Protecting With Extra Paths (NPS-I):

We will describe the network protection strategy NPS-I against a single link failure in optical networks. Assume a source $s_i$ generates a message $x_i^\ell$ at round time $t_\delta^t$. Put differently $$\text{packet}_{s,i} = (ID_{si}, x_i^\ell, t_\delta^t) \quad (3.6)$$

The packet$_{s_i}$ is transmitted from the source $s_i$ to a destination $r_i$ for all $1 \leq i \leq n$. It is sent in the primary working path $L_i$, i.e. a path that conveys an unencoded data. The secondary protection path provisioned from a source s to destination r can convey the message $$\text{packet}_s = \left(ID_s, \sum_{i=1}^{n} x_i^t, t_\delta^t\right). \quad (3.7)$$

This process is explained in Equation 3.8

$$(3.8)$$

| | round time session 1 | | | | | | ... | ... |
|---|---|---|---|---|---|---|---|---|
| | 1 | 2 | 3 | ... | ... | n | ... | ... |
| $s_1 \to r_1$ | $x_1^1$ | $x_1^2$ | $x_1^3$ | ... | ... | $x_1^n$ | ... | ... |
| $s_2 \to r_2$ | $x_2^1$ | $x_2^2$ | $x_2^3$ | ... | ... | $x_2^n$ | ... | ... |
| $s_3 \to r_3$ | $x_3^1$ | $x_3^2$ | $x_3^3$ | ... | ... | $x_3^n$ | ... | ... |
| ⋮ | ⋮ | ⋮ | ⋮ | ⋮ | ⋮ | ⋮ | | |
| $s_i \to r_i$ | $x_i^1$ | $x_i^2$ | ... | $x_i^{i-1}$ | ... | $x_i^n$ | ... | ... |
| ⋮ | ⋮ | ⋮ | ⋮ | ⋮ | ⋮ | ⋮ | | |
| $s_n \to r_n$ | $x_n^1$ | $x_n^2$ | $x_n^3$ | ... | ... | $x_n^n$ | ... | ... |
| $s \to r$ | $y_1$ | $y_2$ | $y_3$ | ... | ... | $y_n$ | ... | ... |

All $y_j$'s are defined over $F_2$ as $$y_j = \sum_{i=1}^{n} x_i^j. \quad (3.9)$$

We can notice that the encoded data $y_j$ is fixed per one session transmission and it is fixed for other sessions. This means that the path $L_j$ is dedicated to send all encoded data $y_1, y_2, \ldots, y_n$.

Lemma 3.3:

The normalized capacity of NPS-I of the network model N described in (2.8) is given by $$C = (n)/(n+1) \quad (3.10)$$

Proof:

In every session, we have n rounds. Furthermore, in every round there are (n+1) senders with n+1 disjoint paths, and only one sender sends encoded data. Therefore $C = n^2/(n+1)n$, which gives the result.

Protecting Without Extra Paths:

If we do not allow extra path, then one of the available working paths can be used to carry the encoded data as shown in Equation 3.1. It is shown that there exists a path $L_j$ that carries the encoded data sent from the source $s_j$ to the receiver $r_j$.

(3.11)

| | round time session 1 | | | | | | | |
|---|---|---|---|---|---|---|---|---|
| | 1 | 2 | 3 | ... | ... | n | ... | ... |
| $s_1 \to r_1$ | $x_1^1$ | $x_1^2$ | $x_1^3$ | ... | ... | $x_1^n$ | ... | ... |
| $s_2 \to r_2$ | $x_2^1$ | $x_2^2$ | $x_2^3$ | ... | ... | $x_2^n$ | ... | ... |
| $s_3 \to r_3$ | $x_3^1$ | $x_3^2$ | $x_3^3$ | ... | ... | $x_3^n$ | ... | ... |
| ⋮ | ⋮ | ⋮ | ⋮ | ⋮ | ⋮ | ⋮ | ... | ... |
| $s_i \to r_i$ | $x_i^1$ | $x_i^2$ | ... | $x_i^{i-1}$ | ... | $x_i^n$ | ... | ... |
| ⋮ | ⋮ | ⋮ | ⋮ | ⋮ | ⋮ | ⋮ | ... | ... |
| $s_j \to r_j$ | $y_j^1$ | $y_j^2$ | $y_j^3$ | ... | ... | $y_j^n$ | ... | ... |
| ⋮ | ⋮ | ⋮ | ⋮ | ⋮ | ⋮ | ⋮ | ... | ... |
| $s_n \to r_n$ | $x_n^1$ | $x_n^2$ | $x_n^3$ | ... | ... | $x_n^n$ | ... | ... |

All $y_j^\ell$ are defined over $F_2$ as $$y_j^t = \sum_{i=1, i \neq j}^{n} x_i^t. \qquad (3.12)$$

We can notice that the encoded data $y_j$ is fixed per one session transmission but it is varied for other sessions. This means that the path $L_j$ is dedicated to send all encoded data $y_1, y_2, \ldots, y_n$.

Lemma 3.4:

The normalized capacity of the network model N described in (11) is given by $$C = (n-1)/n \qquad (3.13)$$

The implementation aspects of this strategy is discussed in subsection 3.6.

3.5 Network Protection Against a SLF Using Distributed Capacity and Coding

In this subsection we will provide a network protection strategy against a single link failure using distributed fairness capacity and coding. This strategy is called NPS-II. We will compute the network capacity in each approach and how the optimal capacity can be written with partial delay at rounds of a given session for a sender $s_i$.

NPS-II Protecting a SLF

We will describe the NPS-II which protects a single link failure suing network coding and reduced capacity. Assume there is a path $L_j$ that will carry the encoded data from the source $s_j$ to the receiver $r_j$. Consider a failed link $(u, v) \in E$, in which the path $L_i$ goes through, we would like to design an encoding scheme such that a backup copy of data on $L_i$ can also be sent over a different path $L_j$. This process is explained in Equation (3.15), and we call it network protection strategy (NPS-II) against a single Link/path failure (SLF). The data is sent in rounds for every session. Also, we assume the failure happens only in one path throughout a session, but different paths might suffer from failures throughout different sessions. Indeed most of the current optical networks suffer experience a single link failure: D. Zhou and S. Subramaniam, Survivability in optical networks, *IEEE network*, 14:16-23, November/December 2000; A. K. Somani, *Survivability and traffic grooming in Optical Networks*, Cambridge Press, 2006.

The objective of the proposed network protection strategy is to withhold rerouting the signals or the transmitted packets due to link failures. However, we provide strategies that utilize network coding and reduced capacity at the source nodes. We assume that the source nodes are able to perform encoding operations and the receiver nodes are able to perform decoding operations. We will allow the sources to provide backup copies that will be sent through the available paths simultaneously and in the same existing connections.

Let $x_i^j$ be the data sent from the source $s_i$ at round time j in a session $\delta$. Also, assume $$y_j = \sum_{\ell=1, \ell \neq i}^{n} x_\ell^j.$$

Put differently $$y_j = x_1^j \oplus x_2^j \oplus \ldots \oplus x_n^j \qquad (3.14)$$

The protection scheme runs in sessions as explained below. For the (n−1)/n strategy presented in (2.15), the design issues are described as follows.

i) A total of (n−1) link disjoint paths between (n−1) senders S and receivers R are provisioned to carry the signals from S to $\mathcal{R}$. Each path has the unit capacity and data unit from $s_i$ in S to $r_i$ in $\mathcal{R}$ are sent in rounds. Data unit $x_i$ is sent from source $s_i$ at round (n) in a specific session.

ii) A server S is able to collect the signals from all n sources and is able to provision $$y_j = \sum_{i=1, i \neq k}^{n} x_i^j$$

at round time j. A single source $s_k$ is used to deliver $y_j$ to the receiver $r_k$. This process is achieved at one particular session. The encoded data $y_j$ is distributed equally among all n sources.

iii) In the first round time at particular session, the data $x_i^1$ is sent from $s_i$ to $r_i$ in all paths for $i=[1, \ldots, n]$ and $i \neq j$. Only the source $s_j$ will send $y_j$ to the receiver $r_j$ over the path $L_j$ at round $t_\delta^\ell$ $$y_i = \sum_{i=1, j \neq i}^{n} x_i^t.$$

iv) We always neglect the communication and computational cost between the senders and data collector S, as well as the receivers and data collector $\mathcal{R}$.

|   | round time session 1 | | | | | | ... |
| --- | --- | --- | --- | --- | --- | --- | --- |
|   | 1 | 2 | 3 | ... | j | ... | n | ... |
| $s_1 \to r_1$ | $x_1^1$ | $x_1^2$ | ... | | $x_1^j$ | ... | $y_n$ | ... |
| $s_2 \to r_2$ | $x_2^1$ | $x_2^2$ | ... | | $x_2^j$ | ... | $x_2^{n-1}$ | ... |
| $s_3 \to r_3$ | $x_3^1$ | $x_3^2$ | ... | | $x_1^j$ | ... | $x_3^{n-1}$ | ... |
| ⋮ | ⋮ | ⋮ | ⋮ | ⋮ | ⋮ | ⋮ | | ... |
| $s_j \to r_j$ | $x_j^1$ | $x_j^2$ | ... | | $y_j$ | ... | $x_j^{n-1}$ | ... |
| ⋮ | ⋮ | ⋮ | ⋮ | ⋮ | ⋮ | ⋮ | | ... |
| $s_{n-1} \to r_{n-1}$ | $x_{n-1}^1$ | $y_2$ | ... | | $x_{n-1}^{j-1}$ | ... | $x_{n-1}^{n-1}$ | ... |
| $s_n \to r_n$ | $y_1$ | $x_n^1$ | ... | | $x_n^{j-1}$ | ... | $x_n^{n-1}$ | ... |

(3.15)

In this case $$y_1 = \sum_{i=1}^{n-1} x_i^1$$

and in general $y_j$'s are defined over $F_2$ as $$y_j = \sum_{i=1}^{n-j} x_i^j + \sum_{i=n-j+2}^{n} x_i^{j-1} \qquad (3.16)$$

The senders send packets to the set of receivers in rounds. Every packet initiated from the sender $s_i$ contains ID, data $x_{s_i}$, and a round $t_\delta^\ell$. For example, the sender $s_i$ will send the packet$_{s_i}$ as follows.

$$\text{packet}_{s_i} = (ID_{s_i}, x_{s_i}, t_\delta^\ell) \qquad (2.17)$$

Also, the sender $s_j$ will send the encoded data $y_{s_j}$ as $$\text{packet}_{s_j} = (ID_{s_j}, x_{s_j}, t_\delta^\ell) \qquad (3.18)$$

We ensure that the encoded data $y_{s_j}$ is varied per one round transmission for every session. This means that the path $L_j$ is dedicated to send only one encoded data $y_j$ and all data $x_j^1$, $x_j^2, \ldots, x_j^{n-1}$.

Remark 3.5:

In NPS-I, the data transmitted from the sources do not experience any round time delay. This means that the receivers will be able to decode the received packets online and immediately recover the failed data.

Lemma 3.6:

The normalized capacity NPS-I of the network model N described in (2.15) is given by $$C = (n-1)/(n) \qquad (3.19)$$

Proof:

We have n rounds and the total number of transmitted packets in every round is n. Also, in every round there are $(n-1)$ un-encoded data $x_1, x_2, \ldots, x_{i \neq j}, \ldots, x_n$ and only one encoded data $y_j$, for all $i=1, \ldots, n$. Hence, the capacity $c_l$ in every round is $n-1$. Therefore, the normalized capacity is given by $$C = \frac{\sum_{\ell=1}^{n} c^\ell}{n * n} = \frac{(n-1)*n}{n^2} \qquad (3.20)$$

The following lemma shows that the network protection strategy NPS-II is in fact optimal if we consider $F_2$. In other words, there exist no other strategies that give better normalized capacity than NPS-II.

Lemma 3.7:

The network protection scheme NPS-II against a single link failure is optimal.

The transmission is done in rounds, hence linear combinations of data has to be from the same round time. This can be achieved using the round time that is included in each packet sent by a sender.

Encoding Process:

There are several scenarios where the encoding operations can be achieved. The encoding and decoding operations will depend mainly on the network topology; how the senders and receivers are distributed in the network.

- The encoding operation is done at only one source $s_i$. In this case all other sources must send their data to $s_i$, in which it will send encoded data over $L_i$. As we assume that all sources have shared paths with each others.
- If we assume there is a data distributor S, then the source nodes send a copy of their data to the data distributor S, in which it will decide which source will send the encoding data and all other sources will send their own data. This process will happen in every round during transmission time.
- The encoding is done by the bit-wise operation which is the fastest arithmetic operation that can be perform among all source's data.
- The distributor S will change the sender that should send the encoded data in every round of a given session.

3.6 Implementation Aspects

In this section we shall provide implementation aspects of our model N in case of a single link failure. The network protection strategy against a link failure is deployed in two processes: Encoding and decoding operations. The encoding operations are performed at the set of sources, in which one or two sources will send the encoded data depending on the used strategy. The decoding operations are performed at the receivers' side, in which a receiver with a failed link had to Xor all other receivers' data in order to recover its own data. Depending on NPS-I or NPS-II the receivers will experience some delay before they can actually decode the packets. If the failure happen in the protection path of NPS-I, then the receivers do not perform any decoding operations because all working paths will convey data from the senders to receivers. However, if the failure happens in the working path, the receivers must perform decoding operations to recovery the failure using the protection path. We also note that the delay will happen only when the failure occurs in the protection paths.

The transmission is done in rounds, hence linear combinations of data has to be from the same round time. This can be achieved using the round time that is included in each packet sent by a sender. In this part we will assume that there is a data distributor S at the sources side and data distributor $\mathcal{R}$ at the receivers side.

Encoding Process:

The encoded process of the proposed protection strategies can be done as follows.

The source nodes send a copy of their data to the data distributor S, then S will decide which source will send the encoding data and all other sources will send their own data. This process will happen in every round during transmission time.

The encoding is done by the bit-wise operation which is the fastest arithmetic operation that can be perform among all source's data.

The server S will change the sender that should send the encoded data in every round of a given session.

This process will be repeated in every session during transmission until all sources send their data.

Figure 11:
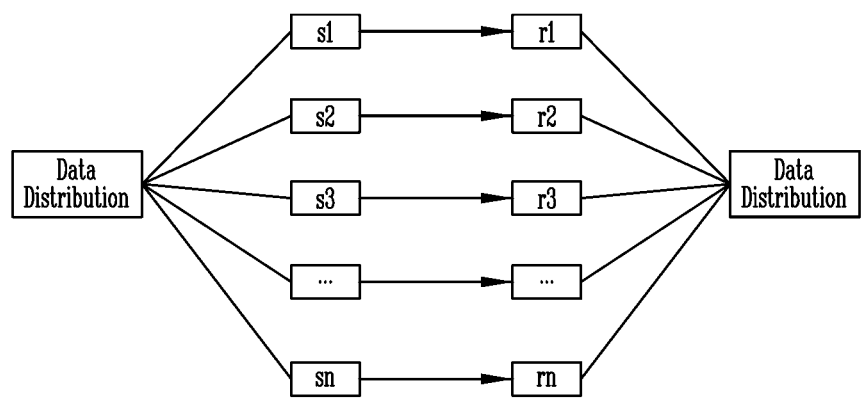
FIG. 11 is a diagram illustrating network protection against single failure using reduced capacity.

Decoding Process:

The decoding process is done in a similar way as the encoding process. We assume there is a data distributor server S that assigns the senders that will send only their own data as shown in FIG. 11. In addition S will encode the data from all senders and distribute it only to the sender that will transmit the encoded data over its path. The objective is to withhold rerouting the signals or the transmitted packets due to link failures. However, we provide strategies that utilize network coding and reduced capacity at the source nodes.

We assume there is a data distributor $\mathcal{R}$ that will collect data from all working and protection paths and is able to perform the decoding operations. In this case we assume that all receivers $\mathcal{R}$ have available shared paths with the data collector $\mathcal{R}$. At the receivers side, if there is at most one single failure in a path $L_k$, then there are several situations.

If the path $L_k$ carries data without encoding (it is a working path), then the data distributor $\mathcal{R}$ must query all other nodes in order to recover the failed data. In this R case $r_k$ must query $\mathcal{R}$ to retrieve its data.

If the path $L_k$ carries encoded data $y_k$, then it does not need to perform any action, since $y_k$ is used for protection and does not have any valued data.

3.7 Conclusions

In this section we present a model for network protection against a single link failure in optical networks. We showed that protecting a single link failure in optical networks can be achieved using network coding and reduced capacity. We provide implementation aspects of the proposed network protection strategies.

4. Network Protection Schemes for Two Link Failures in Optical Networks

In this section we develop network protection strategies, NPS2-I and NPS2-II, against two link failures in optical networks. The motivation behind this work is the fact that the majority of all available links in an optical network suffers from single and double link failures. In the proposed strategies NPS2-I and NPS2-II we deploy network coding and reduced capacity on the working paths to provide backup protection paths. In addition, we demonstrate the encoding and decoding aspects of the given strategies.

4.1 Introduction

One of the main services of operation networks that must be deployed efficiently is reliability. In order to deploy a reliable networking strategy, one needs to protect the transmitted signals over unreliable links. Link failures are common problems that might occur frequently in single and multiple operating communication circuits. In network survivability and network resilience, one needs to design efficient strategies to overcome this dilemma. Therefore, optical network survivability techniques are classified as pre-designed protection and dynamic restoration: F. J. MacWilliams and N. J. A. Sloane, *The Theory of Error-Correcting Codes*, Amsterdam: North-Holland, 1977; A. E. Kamal, 1+N protection in optical mesh networks using network coding on p-cycles, In *Proc. of the IEEE Globecom*, 2006. The approach of using pre-designed protections aims to reserve enough bandwidth such that when a failure occurs, backup paths are used to reroute the transmission and be able to recover the data. Examples of this type are 1-1 and 1-N protections: C. Fragouli, J. Le Boudec, and J. Widmer, Network coding: An instant primer. *ACM SIGCOMM Computer Communication Review*, 36(1):63-68, 2006; A. E. Kamal, 1+N protection against multiple faults in mesh networks, In *Proc. of the IEEE International Conference on Communications (ICC)*, 2007. In dynamic restoration reactive strategies, capacity is not reserved. However, when the failure occurs, dynamic recovery is used to recover the data transmitted in the links that are suffered from failures. This technique does not need preserved resources or provision of extra paths that work in cases of failures. In this work we will provide several strategies of dynamic restoration based on coding and reduced distributed fairness capacities.

Network protection against single and multiple link failures using adding extra paths has been introduced in: W. C. Huffman and V. Pless, *Fundamentals of Error-Correcting Codes*, Cambridge University Press, Cambridge, 2003; A. E. Kamal, 1+N protection in optical mesh networks using network coding on p-cycles, In *Proc. of the IEEE Globecom*, 2006. The source nodes are able to combine their data into extra paths (backup protection paths) that are used to protect all signals on the working paths carrying data from all sources. In both cases, p-cycles has been also used for protection against single and multiple link failures.

Network coding is a powerful tool that has been recently used to increase the throughput, capacity, and performance of communication networks. Information theoretic aspects of network coding have been investigated in: D. R. Karger, Random sampling in cut, flow and network design problems, *Math. of Oper. Res.*, 24(2):0383 0413, 1999; R. Ahlswede, N. Cai, S.-Y. R. Li, and R. W. Yeung, Network information flow, *IEEE Trans. Inform. Theory*, 46:1204-1216, 2000. Network coding allows the intermediate nodes not only to forward packets using network scheduling algorithms, but also encode/decode them using algebraic primitive operations, see: R. Ahlswede, N. Cai, S.-Y. R. Li, and R. W. Yeung, Network information flow, *IEEE Trans. Inform. Theory*, 46:1204-1216, 2000; C. Fragouli and A. Markopoulou, A network coding approach to overlay network monitoring, In *44th Annual Allerton Conference on Communication, Control, and Computing*, Monticello, Ill., September 2005; D. R. Karger, Random sampling in cut, flow and network design problems, *Math. of Oper. Res.*, 24(2):0383 0413, 1999 and references therein. As an application of network coding, data loss because of failures in communication links can be detected and recovered if the sources are allowed to perform network coding operations. Network coding is used to maximize the throughput: R. Ahlswede, N. Cai, S.-Y. R. Li, and R. W. Yeung, Network information flow, *IEEE Trans. Inform. Theory*, 46:1204-1216, 2000; A. E. Kamal, Gmpls-based hybrid 1+N link protection over p-cycles: Design and performance, In *Proc. of IEEE Globecom*, 2007. Also, it is robust against packet losses, and network failures and protection: T. Ho, R. Koetter, M. Medard, D. Karger, and M. Effros, The benefits of coding over routing in a randomized setting, In *Proc. of the IEEE International Symposium on Information Theory (ISIT03)*, page 442, Yokohama, Japan, June 2003; A. E. Kamal, A generalized strategy for 1+N protection, In *Proc. of the IEEE International Conference on Communications*

(ICC), 2008; T. Ho, B. Leong, Y. Chang, Y. Wen, and R. Koetter, Network monitoring in multicast networks using network coding, In *Proc. of International Symposium on Information Theory (ISIT05)*, 2005.

In this section we design schemes for network protection against one and two links' failures. The approach is based on network coding of data originated by the sources. We assume that network capacity will be reduced by partial factor in order to achieve the required protection. Several advantages of NPS2-I and NPS2-II can be stated as:

The data sent from the sources are protected without adding extra paths. We assume that two of the working paths will carry encoded data, hence they are protection paths.

The encoding and decoding operations are achieved with less computation cost at both the sources and receivers. The recovery from failures is achieved immediately without asking the senders to retransmit the lost data.

The normalized network capacity is (n−2)/n, which is near-optimal in case of using large number of connections n.

4.2 Network Model

In this subsection we present the network model and some basic terminology.

(i) Let N be a network represented by an abstract graph G=(V,E), where V is the set of nodes and E be a set of undirected edges. Let S and R be sets of independent sources and destinations, respectively. The set V=V∪S∪R contains the relay, sources, and destinations nodes. Assume for simplicity that |S|=|R|=n, hence the set of sources is equal to the set of receivers.

(ii) A path (connection) is a set of edges connected together with a starting node (sender) and an ending node (receiver).

$$L_i = \{(s_i, e_1), (e_{1i}, e_{2i}), \ldots, (e_{(m)i}, r_i)\},$$

where $1 \leq i \leq n$ and $(e_{(j-1)i}, e_{ji}) \in E$ for some integer m.

(iii) The node can be a router, switch, or an end terminal depending on the network model $\mathcal{N}$ and the transmission layer.

(iv) L is a set of paths $L = \{L_1, L_2, \ldots, L_n\}$ carrying the data from the sources to the receivers as shown in FIG. 9. All connections have the same bandwidth, otherwise a connection with high bandwidth can be divided into multiple connections, each of which has a unit capacity. There are exactly n connections. The failure on a link $L_i$ may occur due to the network circumstance such as a link replacement, overhead, etc.

(v) Each sender $s_i \in S$ will transmit its own data $x_i$ to a receiver $r_i$ through a connection $L_i$. Also, $s_i$ will transmit encoded data $$\sum_{i}^{n} x_i$$

to $r_i$ at different time slot if it is assigned to send the encoded data.

(vi) The data from all sources are sent in sessions. Each session has a number of time slots n. Hence $t_\delta^l$ is a value at round time slot l in session δ.

(vii) In this model N if we consider only a single link failure, then it is sufficient to apply the encoding and decoding operations over a finite field with two elements, we denote it $F_2 = \{0, 1\}$. However, if there are double failures, then a finite field with higher alphabets is required.

(viii) There are at least two receivers and two senders with at least two disjoint paths, otherwise the protection strategy can not be deployed for a single path, which it can not protect itself.

We can define the network capacity in the light of min-cut max-flow information theoretic view R. Ahlswede, N. Cai, S.-Y. R. Li, and R. W. Yeung. Network information flow. *IEEE Trans. Inform. Theory*, 46:1204-1216, 2000.

DEFINITION 4.1

The capacity of a connecting path $L_i$ between $s_i$ and $r_i$ is defined by $$c_i = \begin{cases} 1, & L_i \text{ is active;} \\ 0, & \text{otherwise.} \end{cases} \quad (4.1)$$

The total capacity is given by the summation of all paths' capacities. What we mean by an active link is that the receiver is able to receive and process signals/messages throughout this link.

Clearly, if all links are active then the total capacity is n and normalized capacity is 1. In general the normalized capacity of the network for the active and failed links is computed as:

$$C_N = \frac{1}{n} \sum_{i=1}^{n} c_i \quad (4.2)$$

We define the working paths and protection paths as follows:

DEFINITION 4.2

The working paths on a network with n connection paths are the paths that carry unencoded data traffic under normal operations. The Protection paths are that provide alternate backup paths to carry encoded data traffic in case of failures. A protection scheme ensures that data sent from the sources will reach the receivers in case of failure incidences on the working paths.

Every sender $s_i$ prepares a packet $\text{packet}_{s_i \to r_i}$ to send to the receiver $r_i$. The packet contains the sender's ID, data $x_i^l$ and a round time for every session $t_\delta^l$ for some integers δ and l. We have two types of packets:

(i) Packets sent without coding, in which the sender does not need to perform any coding operations. For example, in case of packets sent without coding, the sender $s_i$ sends the following packet to the receiver $r_i$.

$$\text{packet}_{s_i \to r_i} := (ID_{s_i}, x_i^l, t_\delta^l) \quad (4.3)$$

(ii) Packets sent with encoded data, in which the sender needs to send other sender's data. In this case, the sender $s_i$ sends the following packet to receiver $r_i$:

$$\text{packet}_{s_i \to r_i} := \left(ID_{s_i}, \sum_{j=1, j \neq i}^{n} x_j^l, t_\delta^l\right) \quad (4.4)$$

The value $$y_j^\ell = \sum_{j=1, j\neq i}^{n} x_j^\ell$$

is computed by every sender $s_i$, in which it is able to collect the data from all other senders and encode them using the bitwise operation. In either case the sender has a full capacity in the connection path $L_i$.

The protection path that carries the encoded data from all sources is used for the data recovery in case of failure. Assuming the encoding operations occur in the same round time of the a particular session, every source $s_i$ adds its value, for $1 \leq i \leq n$. Therefore, the encoded data over the protection path is $$y_i = \sum_{j=1, i\neq j}^{n} x_j.$$

The decoding operations are done at every receiver $r_i$ by adding the data $x_i$ received over the working path $L_i$. The node $r_k$ with failed connection $L_k$ will be able to recover the data $x_k$. Assuming all operations are achieved over the binary finite field $F_2$. Hence we have $$x_k = y_i - \sum_{j=1, i\neq j}^{n} x_j. \quad (4.5)$$

4.3 Protections Using Dedicated Paths (NPS2-I)

In this section we develop a network protection scheme (NPS2-I) for two link failures in optical networks. The protection scheme is achieved using network coding and dedicated paths. Assume we have n connections carrying data from a set of n sources to a set of n receivers. All connections represent disjoint paths, and the sources are independent of each other. The authors in W. C. Huffman and V. Pless. *Fundamentals of Error-Correcting Codes*. Cambridge University Press, Cambridge, 2003; and P. A. Chou, Y. Wu, and K. Jain. Practical network coding. 41*st Allerton Conf. Comm., Ctrl. and Comp.*, Monticello, Ill., October 2003 introduced a model for optical network protection against a single link failure using an extra and dedicated paths provisioning. In this model NPS2-I we extend this approach to two link failures.

We will provide two backup paths in cases of any two disjoint links, which might experience failures. These two protection paths can be chosen using network provisioning. The protection paths are fixed for all rounds per session, but they may vary among sessions. This process is explained in Equation (4.6) as:

|  | round time session 1 |  |  |  |  | ... |
|---|---|---|---|---|---|---|
|  | 1 | 2 | 3 | ... | n | ... |
| $s_1 \to r_1$ | $x_1^1$ | $x_1^2$ | $x_1^3$ | ... | $x_1^n$ | ... |
| $s_2 \to r_2$ | $x_2^1$ | $x_2^2$ | $x_2^3$ | ... | $x_2^n$ | ... |
| $s_3 \to r_3$ | $x_3^1$ | $x_3^2$ | $x_3^3$ | ... | $x_3^n$ | ... |
| $\vdots$ | $\vdots$ | $\vdots$ | $\vdots$ |  | $\vdots$ | ... |
| $s_i \to r_i$ | $x_i^1$ | $x_i^2$ | $x_i^3$ | ... | $x_i^n$ | ... |
| $s_j \to r_j$ | $x_j^1$ | $x_j^2$ | $x_j^3$ | ... | $x_j^n$ | ... |
| $s_k \to r_k$ | $x_k^1$ | $x_k^2$ | $x_k^3$ | ... | $x_k^n$ | ... |
| $s_{i+1} \to r_{i+1}$ | $x_{i+1}^1$ | $x_{i+1}^2$ | $x_{i+1}^3$ | ... | $x_{i+1}^n$ | ... |
| $\vdots$ | $\vdots$ | $\vdots$ | $\vdots$ | $\vdots$ | $\vdots$ | ... |
| $s_n \to r_n$ | $x_n^1$ | $x_n^2$ | $x_n^3$ | ... | $x_n^n$ | ... |

(4.6)

All $y_i^\ell$'s are defined as:

$$y_j^t = \sum_{i=1, i\neq j}^{n} a_i^t x_i^t \text{ and } y_k^t = \sum_{i=1, i\neq k}^{n} b_i^t x_i^t \quad (4.7)$$

The coefficients $a_i^t$ and $b_i^t$ are chosen over a finite field $F_q$ with $q \geq n$. We notice that the encoded data symbols $y_i^\ell$ and $y_k^t$ are fixed per one session transmission but it is varied for other sessions. This means that the path $L_j$ is dedicated to send all encoded data $y_j^1, y_j^2, \ldots, y_j^n$.

Lemma 3.3:

The normalized capacity of NPS2-I of the network model N described in (3.6) is given by $$C = (n-2)/n. \quad (4.8)$$

Proof: There are n rounds in every session. Also, we have n connections per a round time. There exist two connections which carry backup data for protection, hence there are n−2 connections that carry working data. Therefore, the normalized capacity is given as:

$$C = (n-2)n/n^2,$$

which gives the result.

In NPS2-I there are two different scenarios for two link failures, which can be described as follows:
  (i) If the two link failures occur in the backup protection paths $L_j$ and $L_k$, then no recovery operations are required at the receivers side. The reason is that these two paths are used for protections, and all other working paths will convey the data from the senders to receivers.
  (ii) If the two link failures occur in one backup protection path say $L_j$ and one working path $L_i$, then recovery operations are required. The receiver $r_i$ must recover its data using one of the protection paths.
  (iii) If the two link failures occur in two working paths, then in this case the two protection paths are used to recover the lost data. The idea of recovery in this case is to build a system of two equations with two unknown variables.

4.4 Protection Against Two Link Failures (NPS2-II)

In this subsection we will provide an approach for network protection against two link failures in optical networks. We deploy network coding and distribute capacity over the working paths. We will compute the network capacity in this approach. In P. A. Chou, Y. Wu, and K. Jain, Practical network coding, 41*st Allerton Conf. Comm., Ctrl. and Comp.*, Monticello, Ill., October 2003 we will illustrate the tradeoff and implementation aspects of this approach, where there is enough space for details.

We assume that there is a set of n connections that need to be protected with %100 guarantee against single and two link failures. Assume $F_q$ is a finite field with q elements. For simplicity we consider n is an even number.

A. Two Link Failures, Achieving (n−2)/n Capacity

Let $x_i^l$ be the data sent from the source $s_i$ at round time l in a session at time $t_\delta^\ell$ Also, assume the encoded data $$y_i = \sum_{j=1, j \neq i}^{n} x_j^\ell.$$

Put differently:

$$y_i = x_1^\ell \oplus x_2^\ell \oplus \ldots \oplus x_{i \neq j}^\ell \oplus \ldots \oplus x_n^\ell \quad (4.9)$$

The protection scheme NPS2-II runs in sessions as explained below. Every session has at most one single failure through out its each round time. As shown in Equation (4.10), the protection matrix for the first session is given by the following protection code:

(4.10)

| | | round time session 1 | | | | |
|---|---|---|---|---|---|---|
| | | 1 | 2 | 3 | ... ... | l |
| $s_1$ | $r_1$ | $y_1^1$ | $x_1^1$ | $x_1^2$ | ... ... | $x_1^{l-1}$ |
| $s_2$ | $r_2$ | $y_2^1$ | $x_2^1$ | $x_2^2$ | ... ... | $x_2^{l-1}$ |
| $s_3$ | $r_3$ | $x_3^1$ | $y_3^2$ | $x_3^2$ | ... ... | $x_3^{l-1}$ |
| $s_4$ | $r_4$ | $x_4^1$ | $y_4^2$ | $x_4^2$ | ... ... | $x_3^{l-1}$ |
| ⋮ | ⋮ | ⋮ | ⋮ | ⋮ | ⋮ ⋮ | ⋮ |
| $s_i$ | $r_i$ | $x_i^1$ | $x_i^2$ | ... | $y_i^j$ | ... | $x_i^{l-1}$ |
| $s_{i+1}$ | $r_{i+1}$ | $x_{i+1}^1$ | $x_{i+1}^2$ | ... | $y_{i+1}^j$ | ... | $x_{i+1}^{l-1}$ |
| ⋮ | ⋮ | ⋮ | ⋮ | ⋮ | ⋮ ⋮ | ⋮ |
| $s_{n-1}$ | $r_{n-1}$ | $x_{n-1}^1$ | $x_{n-1}^2$ | $x_{n-1}^3$ | ... ... | $y_{n-1}^j$ |
| $s_n$ | $r_n$ | $x_n^1$ | $x_n^2$ | $x_n^3$ | ... ... | $y_n^j$ | where $$y_k^r = \sum_{i=1}^{2(\ell-1)} a_i^{r-1} x_i^{r-1} + \sum_{i=2\ell+1}^{n} a_i^r x_i^r \quad (4.11)$$

for $(2\ell - 1) \leq k \leq 2\ell$, $1 \leq \ell \leq n/2$

All coefficients are taken from $F_q$ for q≥n. We note that the data symbols in NPS2-II are sent in independent sessions. This means that every session has its own recovery scheme. Also, two failures occur in only two connections during the session round times. Hence the sender $s_i$ sends the message $x_i^j$ for all $1 \leq j \leq \ell -1$ and $1 \leq i \leq n$ during the first session. One can always change the round time of the encoded data $y_k^l$ and the data $x_i^j$ for any round time j in the same session.

Now, we shall compute the normalized capacity of NPS2-II for the network N at one particular session; the first session. The capacity is calculated using the well-known min-cut max-flow theorem: R. Ahlswede, N. Cai, S.-Y. R. Li, and R. W. Yeung, Network information flow, *IEEE Trans. Inform, Theory,* 46:1204-1216, 2000.

Theorem 4.4:

The optimal fairness distributed normalized capacity of NPS2-II shown in Equation (4.10) is given by $$C=(n-2)/n. \quad (4.12)$$

Proof:

Let n be the number of sources, each of which has a unit capacity in the connection $L_i$ from $s_i$ to $r_i$. Let j be an index of an arbitrary session that has two link failures. We have n paths that have capacity n. Also, we have l=n/2 round times, in which each round time has n−2 capacity in the working paths. Therefore the total capacity is given by $$(n-2)(\ell)=(n^2-2n)/2. \quad (4.13)$$

By normalizing this value with the total capacity n $\ell$ then the result follows.

The network protection strategy NPS2-II against one or two link failures is deployed in two processes: Encoding and decoding operations. The transmission is done in rounds, hence linear combinations of data has to be from the same round time. This can be achieved using the round time that is included in each packet sent by a sender.

Assume there are data collectors S and $\mathcal{R}$ at the senders and receivers, respectively. They can be a sender (receiver) node to send (receiver) encoded data, see P. A. Chou, Y. Wu, and K. Jain, Practical network coding, 41*st Allerton Conf. Comm., Ctrl. and Comp.*, Monticello, Ill., October 2003.

Encoding Process:

The encoding operations are for each round per a session.

The source nodes send a copy of their data to the data distributor S, then S will decide which source will send the encoding data $y_k^\ell$ and all other sources will send their own data $x_i^\ell$ This process will happen in every round during transmission time.

The encoding is done by linear operation of sources' coefficients which is the fastest arithmetic operation that can be performed among all source's data.

The server S will change the sender $s_i$ that should send the encoded data $y_i^\ell$ in every round of a given session for the purpose of fairness and distributed capacities.

Decoding Process:

The objective of the decoding and recovery process is to withhold rerouting the signals or the transmitted packets due to link failures, see: C. Fragouli, J. Le Boudec, and J. Widmer, Network coding: An instant primer, *ACM SIGCOMM Computer Communication Review,* 36(1):63-68, 2006; P. A. Chou, Y. Wu, and K. Jain, Practical network coding, 41*st Allerton Conf. Comm., Ctrl. and Comp.*, Monticello, Ill., October 2003; A. E. Kamal, 1+N protection in optical mesh networks using network coding on p-cycles, In *Proc. of the IEEE Globecom,* 2006.

We assume there is a data distributor R that will collect data from all working and protection paths and is able to perform the decoding operations. In this case we assume that all receivers $\mathcal{R}$ have available shared paths with the data collector $\mathcal{R}$. At the receivers side, if there are two failures in paths $L_j$ and $L_k$, then there are several situations.

If the paths $L_j$ and $L_k$ carry unencoded data (they are working paths), then the data distributor $\mathcal{R}$ must query all other nodes in order to recover the failed data. In this case $r_k$ and $r_j$ must query $\mathcal{R}$ to retrieve their lost data.

If the path $L_k$ carries encoded data $y_k$ (protection path) and $L_j$ carries unencoded data (working path), then data collector $\mathcal{R}$ must query all other receivers in order to perform decoding, and $r_j$ receives the lost data $y_j^\ell$ If the paths $L_j$ and $L_k$ carry encoded data (they are both protection paths), then no action is required.

4.5. Conclusions

In this section we presented network protection schemes NPS2-I and NPS2-II against single and double link failures in optical networks. We showed that protecting two failures can be achieved using network coding and reduced capacity. The normalized capacity of the proposed schemes is (n−2)/n, which is near optimal for large values of connections.

5. On Network Protection Coding-Based Using Distributed Capacity

The scheme is extended to protect against multiple link failures and can be implemented at an overlay layer. Although this leads to reducing the network capacity, the network capacity reduction is asymptotically small in most cases of practical interest.

5.1 Introduction

Network coding is a powerful tool that has been used to increase the throughput, capacity, and performance of communication networks: E. Soljanin and C. Fragouli, Network coding information flow perspective, 2007; R. W. Yeung, S.-Y. R. Li, N. Cai, and Z. Zhang, *Network Coding Theory*, Now Publishers Inc., 2006. It offers benefits in terms of energy efficiency, additional security, and reduced delay. Network coding allows the intermediate nodes not only to forward packets using network scheduling algorithms, but also encode/decode them using algebraic primitive operations, see: R. Ahlswede, N. Cai, S.-Y. R. Li, and R. W. Yeung, Network information flow, *IEEE Trans. Inform. Theory*, 46:1204-1216, 2000; C. Fragouli, J. Le Boudec, and J. Widmer, Network coding: An instant primer, *ACM SIGCOMM Computer Communication Review*, 36(1):63-68, 2006; E. Soljanin and C. Fragouli, Network coding information flow perspective, 2007; R. W. Yeung, S.-Y. R. Li, N. Cai, and Z. Zhang, *Network Coding Theory*, Now Publishers Inc., 2006 and references therein. One application of network coding that has been proposed recently is to provide protection against link failures in overlay networks: A. E. Kamal, 1+N protection in optical mesh networks using network coding on p-cycles, In *Proc. of the IEEE Globecom*, 2006; A. E. Kamal, A generalized strategy for 1+N protection, In *Proc. of the IEEE International Conference on Communications (ICC)*, 2008. This is achieved by transmitting combinations of data units from multiple connections on a backup path in a manner that enables each receiver node to recover a copy of the data transmitted on the working path in case the working path fails. This can result in recovery from failures without data rerouting, hence achieving agile protection. Moreover, the sharing of protection resources between multiple connections through the transmission of linear combinations of data units results in efficient use of protection resources. This, however, requires the establishment of extra paths over which the combined data units are transmitted. Such paths may require the addition of links to the network under the Separate Capacity Provisioning strategy (SCP), or that paths be provisioned using existing links if using the Joint Capacity Provisioning strategy (JCP), hence reducing the network traffic carrying capacity.

Certain networks can allow extra transmissions and the addition of bandwidth, but they do not allow the addition of new paths. In this scenario, one needs to design efficient data recovery schemes. Several previous approaches focused on solving this problem using additional extra paths at an overlay network level, or deploying ARQ protocols for the recovery of lost packets. In order to provide recovery from link failures in such networks, approaches other than using dedicated paths, or adding extra links must be used. In this section, we propose such an approach in which we use network coding to provide agile, and resource efficient protection against link failures, and without adding extra paths. The approach is based on combining data units from a number of sources, and then transmitting the encoded data units using a small fraction of the bandwidth allocated to the connections, hence disposing of the requirement of having extra paths. In this scenario, once a path fails, the receiver can recover the lost packets easily from the neighbors by initiating simple queries.

Previous solutions in network survivability approaches using network coding focused on providing backup paths to recover the data affected by the failures: A. E. Kamal, 1+N protection in optical mesh networks using network coding on p-cycles, In *Proc. of the IEEE Globecom*, 2006; A. E. Kamal, 1+N protection against multiple faults in mesh networks, In *Proc. of the IEEE International Conference on Communications (ICC)*, 2007; A. E. Kamal, Gmpls-based hybrid 1+N link protection over p-cycles: Design and performance, In *Proc. of IEEE Globecom*, 2007. Such approaches include 1+N, and M+N protections. In 1+N protection, an extra secondary path is used to carry combinations of data units from N different connections, and is therefore used to protect N primary paths from any single link failure. The M+N is an extension of 1+N protection where M extra secondary paths are needed to protect multiple link failures.

In this section, we apply network coding for network protection against link failures and packet loss. We define the concept of protection codes similar to error-correcting codes that are widely used in channel coding: W. C. Huffman and V. Pless, *Fundamentals of Error-Correcting Codes*, Cambridge University Press, Cambridge, 2003; F. J. MacWilliams and N. J. A. Sloane, *The Theory of Error-Correcting Codes*, Amsterdam: North-Holland, 1977. Protection codes are a new class of error monitoring codes that we propose in subsection 5.5. Such codes aim to provide better provisioning and data recovery mechanisms. A protection code is a defined by a matrix G known at a set of senders S and receivers R. Every column vector in the generator matrix of a protection code dense the set of operations, in which every sender (receiver) needs to perform.

In this embodiment:

i) We introduce link protection network coding-based using reduced capacity instead of adding extra paths as shown in the previous work: A. E. Kamal, 1+N protection in optical mesh networks using network coding on p-cycles, In *Proc. of the IEEE Globecom*, 2006; A. E. Kamal, 1+N protection against multiple faults in mesh networks, In *Proc. of the IEEE International Conference on Communications (ICC)*, 2007; A. E. Kamal, Gmpls-based hybrid 1+N link protection over p-cycles: Design and performance, In *Proc. of IEEE Globecom*, 2007.

ii) We develop a theoretical foundation of protection codes, in which the receivers are able to recover data sent over t failed links out of n primary links.

This section is organized as follows. In subsection 5.2 we briefly state the related work and previous solutions to our network protection problem. In subsection 5.3 we present the network model and problem definition. Subsections 5.4 and 5.5 discuss single and multiple link failures and how to protect these link failures using reduced capacity and network coding. In subsection 5.6 we give analysis of the general case of t<<n link failures, and the subsection is concluded in subsection 5.7.

5.2. Related Work

In A. E. Kamal, 1+N protection in optical mesh networks using network coding on p-cycles, In *Proc. of the IEEE Globecom*, 2006, the author introduced a 1+N protection model in optical mesh networks using network coding over p-cycles. The author suggested a model for protecting N connections from a set of sources to a set of receivers in a network with n connections, where one connection might fail. The suggested model can protect against a single link failure in any arbitrary path connecting a source and destination.

In A. E. Kamal, 1+N protection against multiple faults in mesh networks, In *Proc. of the IEEE International Conference on Communications (ICC)*, 2007, the author extended the previous model to protect multiple link failures. It is shown that protecting against m failures, at least m p-cycles are needed. An illustrative example in case of two link failures was given. The idea was to derive m linearly independent equations to recover the data sent from m sources.

In A. E. Kamal, Gmpls-based hybrid 1+N link protection over p-cycles: Design and performance, In *Proc. of IEEE Globecom*, 2007, the author extended the protection model in A. E. Kamal, 1+N protection in optical mesh networks using network coding on p-cycles, In *Proc. of the IEEE Globecom*, 2006 and provided a GMPLS-based implementation of a link protection strategy that is a hybrid of 1+N and 1:N. It is claimed that the hybrid 1+N link protection provides protection at higher layers and with a speed that is comparable to the speed achieved by the physical layer implementations. In addition, it has less cost and much flexibility.

Monitoring network information flow using network coding was introduced in T. Ho, B. Leong, Y. Chang, Y. Wen, and R. Koetter, Network monitoring in multicast networks using network coding, In *Proc. of International Symposium on Information Theory (ISIT05)*, 2005; T. Ho, R. Koetter, M. Medard, D. Karger, and M. Effros, The benefits of coding over routing in a randomized setting, In *Proc. of the IEEE International Symposium on Information Theory (ISIT03)*, page 442, Yokohama, Japan, June 2003. In C. Fragouli and A. Markopoulou, A network coding approach to overlay network monitoring, In *44th Annual Allerton Conference on Communication, Control, and Computing*, Monticello, Ill., September 2005, it was shown how to use network coding techniques to improve network monitoring in overlay networks. Practical aspects of network coding has been shown in P. A. Chou, Y. Wu, and K. Jain, Practical network coding, *41st Allerton Conf. Comm., Ctrl. and Comp.*, Monticello, Ill., October 2003.

In this embodiment, we provide a new technique for protecting network failures using protection codes and reduced capacity. This technique can be deployed at an overlay layer in optical mesh networks, in which detecting failure is an essential task. The benefits of our approach are that:

i) It allows receivers to recover the lost data without contacting a third parity or main domain server.
ii) It has less computational complexity and does not require adding extra paths.
iii) All n links have full capacity except at two paths in case of protecting against a single link failure and m<<n paths in case of protecting against t=⌊n/2⌋ link failures.

5.3 Network Model

Let G=(V, E) be a graph which represents an abstraction of a set of connections. V is a set of network nodes and E is a set of edges. Let S ⊂ V be a set of sources $\{s_i, \ldots, s_n\}$ and R ⊂ V\S be a set of receiver nodes $\{r_1, \ldots, r_n\}$ in G. Two nodes u and v in V\{S∪R} are connected by an edge (u, v) in E if there is a direct connection between them. We assume that the sources are independent of each other, meaning they can only send messages and there is no correlation between them. For simplicity, we will assume that a direct disjoint path exists between $s_i$ and $r_i$.

The graph G represents an abstraction of our network model N with the following assumptions.

i) Let $\mathcal{N}$ be a network with a set of sources S=$\{s_1, s_2, \ldots, s_n\}$ and a set of receivers R=$\{r_1, r_2, \ldots, r_n\}$, where S∪R ⊂ V.

ii) Let L be a set of links $L_1, L_2, \ldots, L_n$ such that there is a link $L_i$ if and only if there is a connection path between the sender $s_i$ and receiver $r_i$.

$$L_i = \{(s_i, w_{1i}), (w_{1i}, w_{2i}), \ldots, (w_{(m)i}, r_i)\} \qquad (5.1)$$

where 1≤i≤n and $(w_{(j-1)i}, w_{ji})$∈E, for +ve integer m. Hence we have |S|=|R|=|L|=n. The n connection paths are pair wise link disjoint.

iii) Every source $s_\ell$ sends a packet with its own $ID_{s_\ell}$ and data $x_\ell$ to the receiver $r_\ell$, so $$\text{packet } s_\ell = (ID_{s_\ell}, x_\ell, t_\ell^\delta), \qquad (5.2)$$

where $t_\ell^\delta$ is the round time at step δ of the source packet packet$_{s_\ell}$.

iv) All links carry uni-directional messages from sources to receivers.

v) We consider the scenario where the cost of adding a new path is higher than just combining messages in an existing path, or there is not enough resources provision to extra paths in the network. These two cases correspond to separate and joint capacity provisioning respectively. We can define the unit capacity $c_i$ of a link $L_i$ as follows.

DEFINITION 5.1

Let $\mathcal{N}$ be a network model defined by a tupple (S, R, L). The unit capacity of a link $L_i$ is given by $$c_i = \begin{cases} 1, & L_i \text{ is active;} \\ 0, & \text{otherwise.} \end{cases} \qquad (5.3)$$

Also, the average normalized capacity of $\mathcal{N}$ is defined by the total number of active links divided by the total number of links n $$C_N = \frac{1}{n}\sum_{i=1}^{n} c_i \qquad (5.4)$$

This means that each source $s_i$ can send one packet per unit time on a link $L_i$. Assume that all links have the same capacity. In fact, we measure the capacity of $\mathcal{N}$ in the sense of the max-flow min-cut theorem, see D. R. Karger, Random sampling in cut, flow and network design problems, *Math. of Oper. Res.*, 24(2):0383 0413, 1999. One can always assume that a source with a large rate can be divided into a set of sources, each of which has a unit link capacity.

We can also define the set of sources that are connected to a source $s_i$ in N as the degree of this source.

DEFINITION 5.2

The number of neighbors with a direct connection to a node u (i.e., a source $s_i$ in S in the network $\mathcal{N}$ is called the node degree of u∈V, and is denoted by $d_n(u)$, i.e., $$1 \leq |N(u)| = d_n(u) \leq n. \quad (5.5)$$

The following definition describes the working and protection paths between two network switches as shown in FIG. 9.

DEFINITION 5.3

The working paths on a network with n connection paths carry traffic under normal operations. The Protection paths provide an alternate backup path to carry the traffic in case of failures. A protection scheme ensures that data sent from the sources will reach the receivers in case of failure incidences on the working paths. Our goal is to provide a reliable method for data protection sent over a link $L_i$ without adding extra paths to the existing ones, but by possibly reducing the source rates slightly. In fact there are network scenarios where adding extra path is not applicable: A. K. Somani, *Survivability and traffic grooming in Optical Networks*, Cambridge Press, 2006; J. Vasseur, M. Pickavet, and P. Demeester, *Network Recovery: Protection and Restoration of Optical, SONET-SDH, IP, and MPLS*, Morgan Kaufmann Publishers Inc. San Francisco, Calif., 2004; D. Zhou and S. Subramaniam, Survivability in optical networks. *IEEE network*, 14:16-23, November/December 2000. We propose a model to protect link failures using network coding where some senders are able to encode other sender's packets. We will study the network protection against link failures at an overlay layer in two cases: Single link failures and multiple link failures 5.4. Protecting Networks Against a Single Link Failure In this section we study the problem of protecting a set of connections against a single link failure in a network $\mathcal{N}$ with a set of sources S and a set of receivers $\mathcal{R}$. This problem has been studied in A. E. Kamal, 1+N protection in optical mesh networks using network coding on p-cycles, In *Proc. of the IEEE Globecom*, 2006; A. E. Kamal, 1+N protection against multiple faults in mesh networks, In *Proc. of the IEEE International Conference on Communications (ICC)*, 2007, by provisioning a path that is link disjoint from all connection paths, and passes through all sources and destinations. All source packets are encoded in one single packet and transmitted over this path. The encoding was dynamic in the sense that packets were added an removed at each source and destination.

Assume that the assumptions about our network model $\mathcal{N}$ and the abstraction graph G presented in Section 5.3 hold. We know that if there is an active link $L_i$ between $s_i$ and $r_i$, then the capacity $c_i$ is the unit capacity. Let us consider the case where every source $s_i$ is able its own data $x_i$ and the encoded data $y_i$. The encoded message $y_i$ is defined as $$y_i = x_1 \oplus \ldots \oplus x_{i-j} \oplus \ldots \oplus x_n \quad (5.6)$$

from all other sources $S \setminus \{s_i\}$ over the finite field $F_2 = \{0, 1\}$, where the symbol $\oplus$ is the XOR operation. Assume that among the set of links L, there is a link $L_i$ for $1 \leq i \leq n$ such that the sources $s_i$ sends a packet to the receivers $r_i$ as follows $$\text{packet}_{s_i} = (ID_{s_i}, x_i, t_i^\delta) \quad (5.7)$$

Assume for now that link $L_j$ has the unit capacity. The source $s_j$ sends a packet that will carry the encoded data $y_j$ to the receiver $r_j$ over the link $L_j$.

$$\text{packet } s_\ell = (ID \, s_\ell, y_j, t_\ell^\delta) \quad (5.8)$$

We assume that the summation operations are performed over $F_2$. Now we consider the case where there is a single failure in a link $L_k$. Therefore, we have two cases:

i) If $k \neq j$, then the receiver $r_k$ needs to query (n−1) nodes in order to recover the lost data $x_k$ over the failed link $L_k$. The reason is that $x_k$ exists either at $r_j$, and it requires information of all other receivers. Hence, the lost data is a plain message.

ii) If the link $L_j$ has a failure, then the receiver $r_j$ does not need to query any other node. In this case the link $L_j$ carries encoded data that is used for protection.

This shows that only one single receiver needs to perform (n−1) operations in order to recover its data if its link is corrupted. In other words, all other receivers will receive the transmitted data from the senders of their own connections with a constant operation O(1).

A. Network Protection Codes (NPC) for a Single Link Failure

We can define the set of sources that will send encoded packets by using constraint matrices. We assume that there is a network protection code $c \subseteq F_2^n$ defined by the constraint matrix $$G = \begin{bmatrix} 1 & 0 & \cdots & 0 & 1 \\ 0 & 1 & \cdots & 0 & 1 \\ \vdots & \vdots & \vdots & \vdots & \vdots \\ 0 & 0 & \cdots & 1 & 1 \end{bmatrix}, \quad (5.9)$$

Without loss of generality, in Equation (5.9), the column vector $(g_{1j} \, g_{2j} \, \ldots \, g_{(n-1)j})^T$ in $F_2^{n-1}$ corresponds to (n−1) sources, say for example the sources $s_1, s_2, \ldots, s_{n-1}$, that will send (update) their values to (n−1) receivers, say i.e., $r_1, r_2, \ldots, r_{n-1}$. Also, there exists one source that will send encoded data. Also, the row vector $(g_{i1} \, g_{i2} \, \ldots \, g_{in})$ in $F_2^n$ determines the channels $L_1, L_2, \ldots, L_n$. The column vector $g_{i(n)}$ corresponds to the source $s_i$ that will carry encoded data on the connection path $L_i$, see FIG. 9.

We can define the protection codes that will protect a single path failure as follows:

DEFINITION 5.4

An (n,n−1) network protection code C is a $2^{n-1}$ dimensional subspace of the space $F_2^n$ defined by the generator matrix G and is able to correct a single network failure of an arbitrary path $L_i$.

We note that the protection codes are also codes that can be used for channel coding detection. Recall that (n,n−1,2) code is a code that encoded (n−1) symbols into n symbols and detects (correct from) a single path failure.

In general, we will assume that the code C defined by the generator matrix G is known for every source $s_i$ and every receiver $r_i$. This means that every receiver will be able to recover the data $x_i$ if the link $L_i$ is corrupted. We assume that the positions of the failures are known. Furthermore, every source node has a copy of the code C. Without loss of generality, the protection matrix among all sources is given by:

|       | $L_1$ | $L_2$ | ... | $L_{n-1}$ | $L_n$ |
|-------|-------|-------|-----|-----------|-------|
| $s_1$ | $x_1$ | 0 | ... | 0 | $x_1$ |
| $s_2$ | 0 | $x_2$ | ... | 0 | $x_2$ |
| ⋮ | ⋮ | ⋮ | ... | ⋮ | ⋮ |
| $s_{n-1}$ | 0 | 0 | ... | $x_{n-1}$ | $x_{n-1}$ |
| total | $x_1$ | $x_2$ | ... | $x_n$ | $y_1$ |

(5.10)

Where $y_1$ is the protection value from every source $s_l$ that will be encoded at source $s_i$, where all $1 \leq \ell \leq n-1$. Put differently, we have $$y_1 = \sum_{\ell=1}^{n=1} x_\ell \qquad (5.11)$$

The summation operation is defined by the XOR operation. We note that the any source $s_i$ can carry the encoded data. Hence from the matrix (4.10), we have $$y_{si} = \sum_{\ell=1, \ell \neq i}^{n} x_i \qquad (5.12)$$

We assume that every source $s_i$ has a buffer that stores its value $x_i$ and the protection value $y_{s_i}$. Hence $s_i$ prepares a packet packet$_{si}$ that contains the values $$\text{packet}_{s_i} = (ID_{s_i}, y_{s_i}, t_i^\delta), \qquad (5.13)$$

where $y s_i$ is defined in Equation (5.12).

Example 5.5

Consider five sources $\{s_1, s_2, s_3, s_4, s_5\}$ and five receivers $\{r_1, r_2, r_3, r_4, r_5\}$. Without loss of generality, let us assume that the source $s_i$ sends its message $x_i$ to the receiver $r_i$ for i={1, 2, 3, 4}. Furthermore, the source $s_5$ sends the message $x_1 \oplus x_2 \oplus x_3 \oplus x_4$ to the receiver $r_5$. This is an example where a single path can be recovered using network coding and protection code shown above.

Hence, the source $s_5$ prepares the message $y_1 = x_1 \oplus x_2 \oplus x_3 \oplus x_4$, and sends the packet $$\text{packet}_{s_5} = (ID_{s_5}, y_1, t_5^\delta).$$

Also, for i={1, 2, 3, 4}, the source $s_i$ sends the packet $$\text{packet}_{s_i} = (ID_{s_i}, x_i, t_5^\delta).$$

So, every receiver $r_\ell$, will obtain a packet at a round time $t_i^\delta$ in a connection path $L_i$. If we assume that there is one failed path, then four receivers will receive their packets correctly. Assuming a receiver, with a failure in its path, knows the matrix G, in this case it is able to query other receivers to obtain its data.

We notice that it is enough to allow only one source node to perform the encoding operations for protecting against a single path failure. This fact can be stated in the following lemma.

Lemma 5.6:

Encoding the data from sources $S \setminus \{s_i\}$ at a source $s_i$ in the network N is enough to protect against a single path failure.

Lemma 5.7:

The total number of encoding operations needed to recover from a single link failure in a network $\mathcal{N}$ with n sources is given by 2(n−1) and the total number of transmissions is n.

The previous lemma guarantees the recovery from a single arbitrary link failure. The reason is that the link that carries encoded data might fail itself and one needs to protect its data.

Lemma 5.8:

In the network model $\mathcal{N}$ the average network capacity of protecting against a single link failure using reduced capacity and network coding is given by (n−1)/n.

Proof:

(Sketch) i) We know that every source $s_\ell$ that sends the data $x_\ell$ has capacity $C_\ell = 1$. ii) Also, the source $s_i$ that sends $x_i$ and the encoded data $y_{s_i}$ at different slots, has a full capacity. iii) The source $s_i$ is not fixed among all nodes S, however, it is rotated periodically over all sources for fairness. On average one source of the n nodes will reduce its capacity. This shows the capacity of $\mathcal{N}$ as stated.

5.5. Protecting Networks Against Multiple Link Failures

In the previous section we introduced a strategy for a single link failure in optical mesh networks, where the chance of a single link failure is much higher than multiple link failures. However, it was shown in: A. K. Somani, *Survivability and traffic grooming in Optical Networks*, Cambridge Press, 2006: D. Zhou and S. Subramaniam, Survivability in optical networks, *IEEE network*, 14:16-23, November/December 2000 through an experimental study that about 30 percent of the failures of the Sprint backbone network are multiple link failures. Hence, one needs to design a general strategy against multiple link failures.

In this section we will generalize protect against t path failures using network protection codes (NPC) and the reduced capacity. We have the following assumptions about the channel model:

i) We assume that any t arbitrary paths may fail and they are independent of each other.
ii) Location of the failures are known, but they are arbitrary among n connections.
iii) Protecting n working paths, k connection must carry plain data, and m=n−k connections must carry encoded
iv) We do not assume adding extra link paths, and every source node is able to encode the incoming packets.
v) We consider the encoding and decoding operations are performed over $F_2$. We will show the connection between error correcting codes and protection codes: W. C. Huffman and V. Pless, *Fundamentals of Error-Correcting Codes*. Cambridge University Press, Cambridge, 2003; F. J. MacWilliams and N. J. A. Sloane, *The Theory of Error-Correcting Codes*, Amsterdam: North-Holland, 1977.

We have n working paths from the senders to receivers. We will assume that a path $L_i$ can have a full capacity or it can manage a buffer that maintains the full capacity where the encoded data is sent.

Assume that the notations in the previous sections hold. Let us assume a network model $\mathcal{N}$ with t>1 path failures. One can define a protection code C which protects n links as shown in the matrix G in Soljanin and C. Fragouli, Network coding information flow perspective. 2007. In general, the matrix G dense the source nodes that will send encoded messages and source nodes that will send only one message without encoding. In order to protect n working paths, k connection must carry plain data, and m=n−k connections must carry encoded data. The generator matrix of the NPC for multiple link failures is given by:

$$G = \begin{bmatrix} 1 & 0 & \cdots & 0 & | & p_{11} & \cdots & g_{1m} \\ 0 & 1 & \cdots & 0 & | & p_{22} & \cdots & g_{2m} \\ \vdots & \vdots & \vdots & & | & \vdots & \vdots & \vdots \\ 0 & 0 & \cdots & 1 & | & p_{k1} & \cdots & p_{km} \\ \underline{\text{identity matrix } k \times k} & & & & \underline{\text{Submatrix } p_{k \times m}} \end{bmatrix} \quad (5.14)$$

where $p_{ij} \epsilon F_2$
The matrix G can be rewritten as $$G = [I_k | P], \quad (5.15)$$

where P is the sub-matrix that defines the redundant data $$\sum_{i=1}^{k} p_{ij}$$

to be sent to a set of sources for the purpose of data protection against data loss and link protection against link failures. Based on the above matrix, every source $s_i$ sends its own message $x_i$ to the receiver $r_i$ via the link $L_i$. In addition m links out of the n links will carry encoded data.

DEFINITION 4.9

An [n,k,d] protection code C is a $2^k$ dimensional subspace of the space $F_2^n$ that is able to correct all network failures up to d−1.

In general the network protection code (NPC), which protects against multiple path failures, can be defined by a generator matrix G known for every sender and receiver. Also, there exists a parity check matrix H corresponds to G such that $GH^T = 0$. We will restrict ourselves in this work for NPC that are generated by a given generator matrix G. Without loss of generality, the protection matrix among all sources is given by (5.16)

| | $L_1$ | $L_2$ | ... | $L_k$ | $L_{k+1}$ | $L_{k+2}$ | ... | $L_n$ |
|---|---|---|---|---|---|---|---|---|
| $s_1$ | $x_1$ | 0 | ... | 0 | $x_1$ | $x_1$ | ... | $x_1$ |
| $s_2$ | 0 | $x_2$ | ... | 0 | $x_2$ | $x_2$ | ... | $x_2$ |
| ⋮ | ⋮ | ⋮ | ... | ⋮ | ⋮ | ⋮ | | ⋮ |
| $s_k$ | 0 | 0 | ... | $x_k$ | $x_k$ | $x_k$ | ... | $x_k$ |
| T | $x_1$ | $x_2$ | ... | $x_k$ | $y_1$ | $y_2$ | ... | $y_m$ |

We ensure that k=n−m paths have full capacity and they carry the plain data $x_1, x_2, \ldots, x_k$. Also, all other m paths have full capacity, in which they carry the encoded data $y_1, y_2, \ldots, y_m$. In addition, the m links are not fixed, and they are chosen alternatively between the n links.

Encoding Process. The network encoding process at the set of senders are performed in a similar manner as in subsection 5.4. Every source $s_i$ has a copy of the matrix G and it will prepare a packet along with its ID in two different cases. First, if the source si will send only its own data xi with a full link capacity, then $$\text{packet}_{s_i} = (ID_{s_i}, x_i, t_i^\delta) \quad (5.17)$$

Second, if the source $s_j$ will send an encoded date in its packet, then $$\text{packet}_{s_j} = \left( ID_{s_j}, \sum_{\ell=1, \ell \neq j}^{k} p_{\ell j} x_\ell, t_j^\delta \right), \quad (5.18)$$

where $p_{\ell j} \in F_2$

Recovery Process.

The recovery process is done as follows. The $\text{packet}_{s_i}$ arrives at a receiver $r_i$ in time slots, hence every packet from a source $s_i$ has a round time $t_i^\delta$. In this case, time synchronization is needed to guarantee the reception of the correct data. The receiver $r_i$ at time slot n will detect the signal in the link $L_i$. If the link $L_i$ failed, then $r_i$ will send a query to other receivers in $R \setminus \{r_i\}$ asking for their received data. Assume there are t path failures. Then we have three cases:

1) All t link failures have occurred in links that do not carry encoded packets, i.e., $\text{packet}_{s_i} = (ID_{s_i}, x_i, t_i^\delta)$. In this case, any receiver $r_j$ that carry encoded packets can send n−t−1 queries to the other receivers with active links asking for their received data. After this process, the receiver $r_j$ is able to decoded all messages and will send individual messages to all receivers with link failures to pass their correct data.

2) All t link failures have occurred in links that carry encoded packets, i.e., $$\text{packet}_{s_j} = \left( ID_{s_j}, \sum_{\ell=1, \ell \neq j}^{k} x_\ell, t_j^\delta \right).$$

In this case we recovery operations are needed.

3) All t link failures have occurred in arbitrary links. This case is a combination of the previous two cases and the recover process is done in a similar way. Only the lost data on the working paths need to be recovered Our future work will include practical implementation issues of our model as shown in case of adding extra paths. The proposed network protection scheme using distributed capacity and coding is able to recover up to $t \leq d_{min} - 1$ link failures among n paths and it has the following advantages:

i) k=n−m links have full capacity and their sender nodes have the same transmission rate.

ii) The m links that carry encoded data are dynamic (distributed) among all n links. So, no single link $L_i$ will suffer from using reduced capacity used in $\mathcal{N}$ iii) The encoding process is simple once every sender $s_i$ knows the NPC. Hence $s_i$ maintains a round time $t_i^\delta$ for each $\text{packet}_{s_i}$.

iv) The recovery from link failures is done in a dynamic and simple way. Only one receiver node needs to perform the decoding process and it passes the data to other receivers that have link failures.

5.6. Analysis

We shall provide theoretical analysis regarding our network protection codes. One can easily compute the number of paths needed to carry encoded messages to protect against t link failures, and compute the average network capacity. The main idea behind NPC is to simplify the encoding operations at the sources and the decoding operations at the receivers. The following lemma demonstrates the average capacity of the proposed network model N.

Lemma 5.10:

Let C be a protection code with parameters $[n, n-m, d_{min}]_2$. Let n and m be the number of sources (receivers) and number of connections carrying encoded packets, the average capacity of the network N is given by $$(n-m)/n \qquad (5.19)$$

Proof: We have m protection paths that carry encoded data. Hence there are n−m working paths that carry plain data. The result is a direct consequence by applying the normalized capacity definition.

Lemma 5.11:

In the network protection model $\mathcal{N}$ in order to protect t network disjoint link failures, the minimum distance of the protection code must be at least t+1.

Proof:

We can assume that the network link failures can happen at any arbitrary paths. The proof comes from the fact that the protection code can detect t failures. The previous lemma ensures that the maximum number of failures that can be recovered is $d_{min}-1$.

For example one can use the Hamming codes with parameters $[2^m-1, 2^m-m-1, 3]_2$ to recover from two failures. One can also puncture these codes to reach the required length, i.e., number of connections.

5.7 Conclusions

We studied a model for recovering from network link failures using network coding and reduced capacity. We defined the concept of network protection codes to protect against arbitrary t link failures. We showed that the encoding and decoding processes of our scheme are simple and can be done in a dynamic way at any arbitrary senders and receivers in an overlay layer on optical mesh networks.

6. Network Coding-Based Production Against Node Failures 6.1 Introduction

With the increase in the capacity of backbone networks, the failure of a single link or node can result in the loss of enormous amounts of information, which may lead to catastrophes, or at least loss of revenue. Network connections are therefore provisioned with the property that they can survive such failures. Several techniques to provide network survivability have been introduced in the literature. Such techniques either add extra resources, or reserve some of the available network resources as backup circuits, just for the sake of recovery from failures. Recovery from failures is also required to be agile in order to minimize the network outage time. This recovery usually involves two steps: fault diagnosis and location, and rerouting connections. Hence, the optimal network survivability problem is a multi-objective problem in terms of resource efficiency, operation cost, and agility. Optimizing these objective has received significant attention recently from researchers and practitioners alike, and has led to designing more efficient reliable networks: H. Zeng and A. Vukovic, The variant cycle-cover problem in fault detection and localization for mesh all-optical networks, *Photo Network communication*, 14:111-122, 2007.

Recently, the inventors have proposed employing the network coding technique in order to protect against single and multiple link failures (A. E. Kamal, 1+N protection in optical mesh networks using network coding on p-cycles, In *Proc. of the IEEE Globecom*, 2006; A. E. Kamal, 1+N protection against multiple faults in mesh networks, In *Proc. of the IEEE International Conference on Communications (ICC)*, 2007), in a manner that achieves both agility and resource efficiency. The idea is to form linear combinations of data packets transmitted on the working circuits, and transmit these combinations simultaneously on a shared protection circuit. The protection circuit can take the form of an additional p-cycle, a path, or a general tree network. A. E. Kamal, 1+N protection in optical mesh networks using network coding on p-cycles, In *Proc. of the IEEE Globecom,* 2006; A. E. Kamal, 1+N protection against multiple faults in mesh networks, In *Proc. of the IEEE International Conference on Communications (ICC),* 2007; A. E. Kamal, A generalized strategy for 1+N protection, In *Proc. of the IEEE International Conference on Communications (ICC),* 2008. In the case of failures, the linear combinations can be used by the end nodes of the connection(s) affected by the failure(s) to recover the lost data packets. These network protection strategies against link failures using network coding have been extended to use reduced capacities instead of reserving, or even adding separate protection circuits. The advantages of using network coding-based protection are twofold: first, one set of protection circuits is shared between a number of connections, hence leading to reduced protection cost; and second, copies of data packets are transmitted on the shared protection circuit after being linearly combined, hence leading to fast recovery of lost data since failure detection and data rerouting are not needed.

In this section we consider the problem of providing protection against node failures using network coding, and using the reduced capacity technique. As a byproduct of this protection strategy, protection against any single link failure is also guaranteed. This is based on representing the node failure by the failure of multiple links. However, the failed links are not any arbitrary links. Since working paths used by the connections that are protected together are link disjoint, the links that need to be protected are used by different connections, This section is organized as follows. Related work to the proposed problem and background on network coding are stated in subsection 6.2. In subsection 6.3 the network model and a few definitions are introduced. Subsection 6.4 introduces the basic principles of representing a node failure by multiple link failures. As an illustration of the implementation, subsection 6.5 considers the case in which a node has the links of one connection only going through the node. Subsection 6.6 generalizes the technique to the case in which multiple connections may traverse a single node. In subsection 6.7 we will provide analysis aspects of the proposed protection strategy, and will then conclude the section in subsection 6.8.

6.2. Background and Related Work

Network coding is a powerful tool that has been recently used to increase the throughput, capacity, and performance of communication networks. Information theoretic aspects of network coding have been investigated in: R. Ahlswede, N. Cai, S.-Y. R. Li, and R. W. Yeung, Network information flow, *IEEE Trans. Inform. Theory,* 46: 1204-1216, 2000; E. Soljanin and C. Fragouli, Network coding information flow perspective, 2007; R. W. Yeung, S.-Y. R. Li, N. Cai, and Z. Zhang, *Network Coding Theory*, Now Publishers Inc., 2006. It offers benefits in terms of energy efficiency, additional security, and reduced delay. Network coding allows the intermediate nodes not only to forward packets using network scheduling algorithms, but also encode/decode them using algebraic primitive operations, see: R. Ahlswede, N. Cai, S.-Y. R. Li, and R. W. Yeung, Network information flow, *IEEE Trans. Inform. Theory,* 46:1204-1216, 2000; C. Fragouli, J. Le Boudec, and J. Widmer, Network coding: An instant primer, *ACM SIGCOMM Computer Communication Review,* 36(1):63-68, 2006; E. Soljanin and C. Fragouli, Network coding information flow perspective. 2007; R. W. Yeung, S.-Y. R. Li, N. Cai, and Z. Zhang, *Network Coding*

Theory, Now Publishers Inc., 2006, and the references therein. As an application of network coding, data loss because of failures in communication links can be detected and recovered if the sources are allowed to perform network coding operations. Network coding is used to maximize the throughput: R. Ahlswede, N. Cai, S.-Y. R. Li, and R. W. Yeung, Network information flow, *IEEE Trans. Inform. Theory*, 46:1204-1216, 2000; S. Jaggi, P. Sanders, A. Chou, M. Errfos, S. Egner, K. Jain, and L. Tolhuizen, Polynomial time algorithms for multicast network code construction, In *IEEE Tran. Inform, Theory,* 2003; R. Koetter and M. Medard, An algebraic approach to network coding, *IEEE/ACM transactions on networking,* 2003, network capacity; A. Ramamoorthy, J. Shi, and R. D. Wesel, On the capacity of network coding for random networks, *IEEE Trans. Info. Theory,* 51(8):2878-2885, August 2005; S. A. Aly, V. Kapoor, J. Meng, and A. Klappenecker, Bounds on the network coding capacity for wireless random networks, In *Third Workshop on Network Coding, Theory, and Applications, NetCod'07,* January 2007; Z. Kong, S. A. Aly, E. Soljanin, E. Yan, and A. Klappenecker, Network coding capacity of random wireless networks under a signal-to-interference-and-noise model, *Proceedings of the 45th Allerton Conference on Communication, Control, and Computing,* Urbana, Ill., September 2007. arXiv:cs-IT/0708.3070v. Also, it is robust against packet losses, and network failures: T. Ho, R. Koetter, M. Medard, D. Karger, and M. Effros, The benefits of coding over routing in a randomized setting, In *Proc. of the IEEE International Symposium on Information Theory (ISIT03),* page 442, Yokohama, Japan, June 2003; D. S. Lun, N. Ranakar, R. Koetter, M. Medard, E. Ahmed, and H. Lee, Achieving minimum-cost multicast, A decentralized approach based on network coding, In *In Proc. the 24th IEEE INFOCOM*, volume 3, pages 1607-1617, March 2005. Recently, some practical aspects of network coding are shown in: C. Gkantsidis and P. Rodriguez, Network coding for large scale content distribution, In *Proc. IEEE INFOCOM*, 2005; S. Katti, H. Rahul, D. Katabi, M. Medard, and J. Crowcroft, Xors in the air: practical wireless network coding, In *Proc. ACM SIGCOMM,* 2006. Network coding can be also used to enhance network security and protection: S. Jaggi, M. Langberg, S. Katti, T. Ho, D. Katabi, and M. Medard, Resilient network coding in the presence of byzantine adversaries, In *Proc. IEEE INFOCOM,* 2007; L. Lima, M. Medard, and J. Barrows, Random linear network coding: A free cipher, In *ISIT* 06, 2006.

In network survivability, the four different types of failures that might affect network operations are: A. K. Somani, *Survivability and traffic grooming in Optical Networks*, Cambridge Press, 2006; D. Zhou and S. Subramaniam, Survivability in optical networks, *IEEE network,* 14:16-23, November/December 2000. 1) link failure, 2) node failure, 3) shared risk link group (SRLG) failure, and 4) network control system failure. Henceforth, one needs to design network protection strategies against these types of failures. Although the common frequent failures are link failures, node failures sometimes happen due to burned switch/router, fire, or any other hardware damage. In addition, the failure might be due to network maintenance. However, node failure is more damaging than link or system failures since multiple connections may be affected by the failure of a single node. Therefore protection against node failure is important. In this work we provide network protection against any node failure by using reduced capacity and network coding.

6.3. Network Model

In this section we introduce the network model and provide the needed assumptions. The following points highlight the main considerations.

Figure 12:
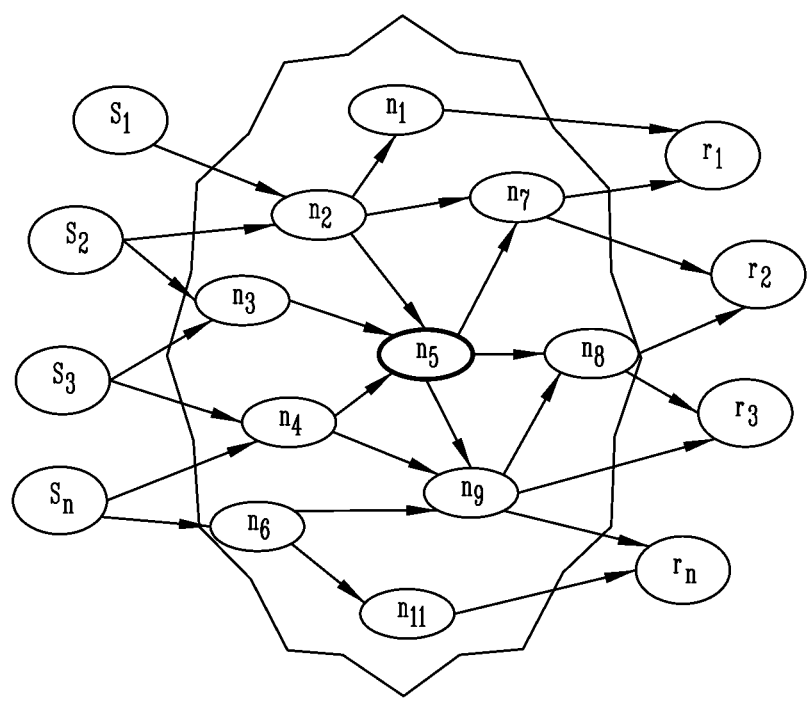
FIG. 12 illustrates a network N with a set of nodes V and a set of edges E. The nodes V consist of sources S, receivers R, and relay nodes V. The node $n_5$ represents a failed node with 3 working connections that must be protected at the failure incidence.

Let N be a network represented by an abstract graph G=(V, E), where V is the set of nodes and E be the set of undirected edges. Let S and $\mathcal{R}$ be sets of independent sources and destinations, respectively. The set V=V∪S∪R contains the relay nodes which are in the set V, sources, and destinations as shown in FIG. 12. Assume for simplicity that |S|=|R|=n, hence the set of sources is equal to the set of receivers.

A path (connection) is a set of edges connected together with a starting node (sender) and an ending node (receiver).

$$L_i = \{(s_i, w_{1i}), (w_{1i}, w_{2i}), \ldots, (w_{(m)i}, r_i)\} \quad (6.1)$$

where $1 \leq i \leq n$, $(w_{(j-1)i}, w_{ji}) \in E$, and +ve integer m.

The node can be a router, switch, or an end terminal depending on the network model N and the transmission layer.

L is a set of paths $L = \{L_1, L_2, \ldots, L_n\}$ carrying the data from the sources to the receivers. Connection paths are link disjoint and provisioned in the network between senders and receivers. All connections have the same bandwidth, otherwise a connection with high bandwidth can be divided into multiple connections, each of which has the unit capacity. There are exactly n connections. For simplicity, we assume that the number of sources is less than or equal to the number of links. A sender with a high capacity can divide its capacity into multiple unit capacities.

We consider the case that the failures happen in the relay nodes. This means that the sources and terminals are free of failures.

We assume that the failures are independent of each other.

DEFINITION 6.1

(Node Relay Degree): Let u be an arbitrary node in V=V\{S∪R}, which relays the traffic between source and terminal nodes. The number of connections passing through this node is called the node relay degree, and is referred to as d(u). Put differently:

$$d(u) = |\{L_i : (u, w) \in L_i, \forall w \in V, 1 \leq i \leq n\}| \quad (6.2)$$

Note that the above definition is different from the graph theoretic definition of the node degrees; input and output degrees. However, the node degree must not be less than the node relay degree. Furthermore, the node relay degree of a node u is $d(u) \leq \lfloor \mu(u)/2 \rfloor$, where $\mu(u)$ is the degree of a node u in an undirected graph.

We can define the network capacity from the min-cut max-flow information theoretic view R. Ahlswede, N. Cai, S.-Y. R. Li, and R. W. Yeung, Network information flow, *IEEE Trans. Inform. Theory,* 46:1204-1216, 2000. It can be described as follows.

DEFINITION 6.2

The unit capacity of a connecting path $L_i$ between $s_i$ and $r_i$ is defined by $$c_i = \begin{cases} 1, & L_i \text{ is active;} \\ 0, & \text{otherwise.} \end{cases} \quad (6.3)$$

The total capacity of $\mathcal{N}$ is given by the summation of all path capacities. What we mean by an active path is that the receiver is able to receive and process signals/packets throughout this path.

Clearly, if all paths are active then the total capacity of all connections is n and the normalized capacity is 1. If we assume there are n disjoint paths, then, in general, the capacity of the network for the active and failed paths is computed by $$C_N = \frac{1}{n}\sum_{i=1}^{n} c_i \qquad (6.4)$$

The following definition describes the working and protection paths between two network switches as shown in FIG. 9.

DEFINITION 6.3

The working paths on a network with n connection paths carry traffic under normal operations. The Protection paths provide an alternate backup path to carry the traffic in case of failures. A protection scheme ensures that data sent from the sources will reach the receivers in case of failure incidences on the working paths.

In A. E. Kamal, 1+N protection in optical mesh networks using network coding on p-cycles, In *Proc. of the IEEE Globecom*, 200, the working and protection paths are separate, and are link disjoint. In this section, there is no global distinction between working and protection paths since path can be a working path at one time, and a protection path at another time. That is, the link capacities are shared between connection traffic and protection traffic.

6.4. Protecting Against a Single Node Failure (SNF)

In this section we demonstrate a model for network protection against a single node failure (SNF) using network coding. Previous work focused on network protection against single and multiple link failures using rerouting and sending packets throughout different links: S. Bjornstad, R. Sudbo, A. Andreassen, E. Zouganeli, N. Stol, and B. Helvik, Node redundancy in optical burst and packet switched networks, In *Proc. IEEE ICTON* '05, pages 25-28, 2005; H. Zeng and A. Vukovic, The variant cycle-cover problem in fault detection and localization for mesh all-optical networks, *Photo Network communication*, 14:111-122, 2007; A. K. Somani, *Survivability and traffic grooming in Optical Networks*, Cambridge Press, 2006. We use network coding and reduced capacity on the paths carrying data from the sources to destinations. The idea has been developed for the purpose of link and paths failures as previously described. We present two different network protection strategies denoted by NPS-I and NPS-T in cases of single and multiple failed paths, respectively. In NPS-I, the normalized network capacity, based on the max-flow between sources and destinations, is given by (n−1)/n, while in NPS-T, it is given by (n−t)/n, where t is the number of failures. In this section we develop the design methodology of these two strategies. In addition we derive bounds on the field size and encoding operations. Tradeoff and implementation aspects of these two strategies have previously been discussed.

Assume we have the same definitions as shown in the previous section. Let d(u) be the relay node degree of a node u in V. We define $d_0$ to be the max over all node's relay degrees in the network N.

$$d_0 = \max_{u \in V} d(u) \qquad (6.5)$$

Note that $d_0$ is the degree representing the max links that can fail, in other words it is the number of working paths that might fail due to the failure of a relay node. Let v be the node with relay degree $d_0$, and assume v to be the failed node. Our goal is to protect the network $\mathcal{N}$ against this node failure. In fact $d_0$ represents a set of failed connections caused by a failure of the node v in the network $\mathcal{N}$. Although the failure of v is represented by the failure of $2d_0$ links, each incoming link at v has a corresponding outgoing link, and if either, or both of these two links fail, the effect on the connection is the same. Therefore, our protection strategy is based on representing the node failure by the failure of $d_0$ connections, and we therefore need to protect against $d_0$ failed connections.

In subsection 6.5 we consider the special case $d_0=1$ and illustrate the network protection strategy NPS-I. The encoding and decoding operations of NPS-I are defined over $F_2$. In subsection 6.6 we demonstrate the general case $d_0=t$, where the failed node carries t working paths, and present the encoding and decoding operations of the network protection strategy NPS-T over $F_q$ for some positive prime power q.

6.5. Protecting Node Failure with a Single Working Path, $d_0=1$

In this section we consider a network with a failed node u with $d_0=1$. This is equivalent to protecting against the failure of one connection. We refer to this protection strategy as NPS-I.

Assume there is a path $L_j$ that will carry the encoded data from the sources. Consider a failed node v, in which the path $L_i$ goes through, we would like to design an encoding scheme such that a backup copy of data on $L_i$ can also be sent over a different path $L_j$. Since any working path may be affected by the node failure, we would like to support the recovery of lost packets due to the failure of any working path. This process is explained in Equation (6.6), in which a linear combination of all packets sent on working paths is transmitted on $L_j$, and $L_j$ is alternately chosen from among all working paths, and we call it network protection strategy (NPS-I) against a single node failure (SNF). The data is sent in rounds for every session.

The objective of the proposed network protection strategy is to be able to recover from data loss without rerouting the signals, or retransmitting packets lost due to link failures. However, we provide strategies that utilize network coding and reduced capacity at the source nodes. We assume that the source nodes are able to perform encoding operations and the receiver nodes are able to perform decoding operations. We will allow the sources to provide backup copies that will be sent through the available paths simultaneously and in the same existing connections.

For the NPS-I strategy presented in (5.6), the design issues are described as follows.

i) A total of n link disjoint paths between n senders S and receivers R are provisioned to carry the signals from S to R. Each path has the unit capacity and data unit from $s_i$ in S to $r_i$ in R are sent to rounds. Data units $x_i^m$ is sent from source $s_i$ at round (m) in a specific session. A session is defined as a n rounds such that each connection transmits exactly (n−1) data units in a session.

ii) A server $S^2$ is able to collect the signals from all n sources and is able to compute $y_j$ for round j, which is a linear combination of the $x_i^j$ and $x_i^{j-1}$ data units, as will be explained below. A single source $s_k$ is used to deliver $y_j$ to the receiver $r_k$ in round j. During a session, the end nodes of each connection take turns in delivering this linear combination, such that each connection delivers exactly one combination in each session, hence providing each node with the opportunity to transmit exactly (n−1) data units every session of n rounds.

iii) We always neglect the communication and computational cost between the senders and data collector S, as well as the receivers and data collector $R^3$.

(6.6)

| | round time session 1 | | | | | | | |
|---|---|---|---|---|---|---|---|---|
| | 1 | 2 | 3 | ... | j | ... | n | ... |
| $s_1 \to r_1$ | $y_1$ | $x_1^1$ | $x_1^2$ | ... | $x_1^{j-1}$ | ... | $x_1^{n-1}$ | ... |
| $s_2 \to r_2$ | $x_2^1$ | $y_2$ | $x_2^2$ | ... | $x_2^{j-1}$ | ... | $x_2^{n-1}$ | ... |
| $s_3 \to r_3$ | $x_3^1$ | $x_3^2$ | $y_3$ | ... | $x_3^{j-1}$ | ... | $x_3^{n-1}$ | ... |
| ⋮ | ⋮ | ⋮ | ⋮ | ⋮ | ⋮ | ⋮ | ⋮ | ... |
| $s_j \to r_j$ | $x_j^1$ | $x_j^2$ | $x_j^3$ | ... | $y_j$ | ... | $x_j^{n-1}$ | ... |
| ⋮ | ⋮ | ⋮ | ⋮ | ⋮ | ⋮ | ⋮ | ⋮ | ... |
| $s_n \to rn$ | $x_n^1$ | $x_n^2$ | $x_n^3$ | ... | $x_n^{j-1}$ | ... | $y_n$ | ... |

In this case $$y_i = \sum_{i=2}^{n} x_i^1 \text{ and } y_n = \sum_{i=1}^{n-1} x_i^{n-1}.$$

In general $y_j$'s are defined over $F_2$ as $$y_J = \sum_{i=1}^{j-1} x_i^{j-1} + \sum_{i=j+1}^{n} x_i^j \quad (6.7)$$

The senders send packets to the set of receivers in rounds. Every packet initiated from the sender $s_i$ contains ID, data $x_{s_i}$, and an indication of the round number, l, and the session number, δ, which is denoted by $t_\delta^\ell$ For example, the sender $s_i$ will send the as packet$_{s_i}$ follows.

$$\text{packet}_{s_i} = (ID_{s_i}, x_{s_i}, t_\delta^\ell) \quad (6.8)$$

Also, the sender $s_j$ will send the encoded data $y_{s_j}$ as $$\text{packet}_{s_j} = (ID_{s_j}, y_{s_j}, t_\delta^\ell) \quad (6.9)$$

We ensure that the encoded data $y_{s_j}$ is varied per one round transmission for every session. This means that the path $L_j$ is dedicated to send only one encoded data $y_j$ and all data $z_j^1$, $x_j^2, \ldots, x_j^{n-1}$.

Remark 6.4:
In NPS-I, the data transmitted from the sources do not experience any round time delay. This means that the receivers will be able to decode the received packets online and immediately recover the failed data.

Lemma 6.5:
The normalized capacity NPS-I of the network model $\mathcal{N}$ described in (5.6) is given by $$C=(n-1)/(n) \quad (6.10)$$

Proof:
We have n rounds and the total number of transmitted packets in every round is n. Also, in every round, $t_\delta^1 = j$, there are (n−1) un-encoded data $x_1, x_2, \ldots, x_{i \neq j}, \ldots, X_n$ and only one encoded data $y_j$, for all i=1, ..., n, and 1≤j≤n. Hence, the capacity $c_j$ in round j is n−1. Therefore, the normalized capacity is given by $$C = \frac{\sum_{j=1}^{n} c_j}{n*n} = \frac{(n-1)*n}{n^2} \quad (6.11)$$

In NPS-I, a single node failure is similar to a single path (link) failure, however in general a single node failure can be also presented as multiple failed paths (links) as we will show in subsection 6.6. In S. A. Aly and A. E. Kamal, Reduced capacity coding-based network protection strategies, *IEEE Transaction on Networking, under submission*, 2008, we will provide implementation aspects of this strategy and how it can be deployed. One can assume that a single path will be dedicated to send the encoded data, and this paths will be fixed throughout all rounds in a session. In this case all senders will send their own data as $$s_i \to r_i : x_i^1, x_i^2, \ldots, x_i^n, \quad (6.12)$$

for all i=1, ..., n, except for path j≠i which is dedicated to send $y_k$ packets. Also, $$s_j \to r_j : y_1, y_2, \ldots, y_n, \quad (6.13)$$

such that $$y_k = \sum_{\ell=1, \ell \neq k}^{n} x_\ell^k.$$

It is easy to show that the normalized capacity in this case will be (n−1)/n.

The following lemma shows that the network protection strategy NPS-I is in fact optimal if we consider $F_2$. In other words, there exist no other strategies that give better normalized capacity than NPS-I.

Lemma 6.6:
The protection scheme NPS-I is optimal.
Proof:
Let n be the total number of disjoint paths, sources, and receivers. Assume there is a strategy that has (n−ϵ)/n for 0≤ϵ<1. The n disjoint paths must be protected by an encoded signal y for every arbitrary round time in every session. Consider one session consisting of n rounds. According to NPS-I described in Equation (6.6), during this session, n encoded data units ($y_1, y_2, \ldots, y_n$) and n(n−1)=$n^2$−n unencoded plain data units ($x_1^\ell, x_2^\ell, \ldots, x_n^\ell$) are transmitted. To increase the capacity, i.e., assume ϵ<1, we need to transmit fewer encoded data units. Let us assume that n−1 encoded data units, and $n^2$−n+1 plain data units are transmitted in a session. Now assume that a path $L_j$ fails. In the worst case, n plain data units will be lost; $x_i^1, x_i^2, \ldots, x_i^n$. However, there will be n−1 equations in n plain data units, which cannot be solved to obtain all missing data units. Therefore, it is not possible to improve the normalized capacity beyond $(n-1)/n$.

The transmission is done in rounds, hence linear combinations of data has to be from the same round time. This can be achieved using the round time that is included in each packet sent by a sender.

Encoding Process:

There are several scenarios where the encoding operations can be achieved. The encoding and decoding operations will depend mainly on the network topology; how the senders and receivers are distributed in the network.

The encoding operation is done at only one source $s_i$. In this case all other sources must send their data to $s_i$, in which it will send encoded data over $L_i$. As assume that all sources have paths with each other.

If we assume there is a data distributor S, then the source nodes send a copy of their data to the data distributor S, in which it will decide which source will send the encoding data and all other sources will send their own data. This process will happen in every round during transmission time.

The encoding is done by the bit-wise operation which is the fastest arithmetic operation that can be perform among all source's data.

The distributor S will change the sender that should send the encoded data in every round of a given session.

Decoding Process:

The decoding process is done in a similar way as previously described. If we assume there is a data distributor server S that assigns the senders that will send only their own data. In addition S will encode the data from all senders and distribute it only to the sender si that send it over the path $L_i$. At the receivers side, if there is at most one single failure in a path $L_k$, then there are several situations.

If the path $L_k$ carries data without encoding (it is a working path), then the receiver rk must query all other nodes in order to recover its data. In this case $r_k$ must have available paths with all other receivers.

If there is a data collector $\mathcal{R}$ at the receivers side, then $r_k$ can just query $\mathcal{R}$ to retrieve its data. In this case we assume that all receivers in $\mathcal{R}$ have available paths with the data collector $\mathcal{R}$.

If the path $L_k$ carries encoded data $y_k$, then it does not need to perform any action, since $y_k$ is used for protection and does not have any valued data.

6.6 Protecting a Single Node Failure with Multiple Working Paths, $d_0 = t$

In this section we study network protection against a single node failure that are connected with multiple working paths. We can generalize NPS-I strategies to protect against a single node failure with t multiple working connections. This approach is a generalization of the proposed network protection strategy previously described, and we will call it NPS-T. Notice that in this case, t must not exceed $d_0$. We therefore consider the worst case, i.e., protecting against $d_0$ failures.

A. NPS-T Protecting SNF with $d_0 = t$ and Achieving $(n-t)/n$ Normalized Capacity Assume the sender si sends a message to the receiver $r_i$ via the path $L_i$. Assume without loss of generality that t disjoint working paths are failed in a single node, then the protection scheme can be described as in Equation (6.14). We consider a finite field with $q > 2$ alphabets.

(6.14)

| | 1 | 2 | 3 | 4 | ... | $\lfloor n/t \rfloor$ |
|---|---|---|---|---|---|---|
| $s_1 \to r_1$ | $y_1$ | $x_1^1$ | $x_1^2$ | $x_1^3$ | ... | $x_1^{n-1}$ |
| $s_2 \to r_2$ | $y_2$ | $x_2^1$ | $x_2^2$ | $x_2^3$ | ... | $x_2^{n-1}$ |
| $\vdots$ | $\vdots$ | $\vdots$ | $\vdots$ | $\vdots$ | $\vdots$ | $\vdots$ |
| $s_t \to r_t$ | $y_t$ | $x_t^1$ | $x_t^2$ | $x_t^3$ | ... | $x_t^{n-1}$ |
| $s_{t+1} \to r_{t+1}$ | $x_{t+1}^1$ | $y_{t+1}$ | $x_{t+1}^2$ | $x_{t+1}^3$ | ... | $x_{2t+1}^{n-1}$ |
| $\vdots$ | $\vdots$ | $\vdots$ | $\vdots$ | $\vdots$ | $\vdots$ | $\vdots$ |
| $s_{2t} \to r_{2t}$ | $x_{2t}^1$ | $y_{2t}$ | $x_{2t}^2$ | $x_{2t}^3$ | ... | $x_{2t}^{n-1}$ |
| $s_{2t+1} \to r_{2t+1}$ | $x_{2t+1}^1$ | $y_{2t+1}^2$ | $y_{2t+1}$ | $x_{2t+1}^3$ | ... | $x_{2t+1}^{n-1}$ |
| $\vdots$ | $\vdots$ | $\vdots$ | $\vdots$ | $\vdots$ | $\vdots$ | $\vdots$ |
| $\vdots$ | $\vdots$ | $\vdots$ | $\vdots$ | $\vdots$ | $\vdots$ | $\vdots$ |
| $s_n \to r_n$ | $x_n^1$ | $x_n^2$ | $x_n^3$ | $x_n^4$ | ... | $y_n$ |

We can see that $y_l$ in general is given by $$y_\ell = \sum_{i=1}^{(j-1)t} a_i^\ell x_i^j + \sum_{i=jt+1}^{n} a_i^\ell x_i^j \qquad (6.15)$$

for $$(j-1)t + 1 \le \ell \le jt, \ 1 \le j \le n$$

The following theorem shows the normalize capacity of NPS-T strategy.

Theorem 6.7:

Let n be the total number of connections from sources to receivers. The capacity of NPS-T strategy against t path failures as a result of a single node failure is given by $$C_N = (n-t)/(n) \qquad (6.16)$$

Proof:

In NPS-T, there are t paths that will carry encoded data in each round time in particular session. Without loss of generality, consider the case that $\lfloor (n/t) \rfloor$ is integer. Therefore, there exists $\lfloor (n/t) \rfloor$ rounds, in which the capacity is $(n/t)$ in each round. Also, the capacity in the first round is $n-t$. Hence, we have $$C_N = \frac{\sum_{i=1}^{\lfloor n/t \rfloor}(n-t)}{\lfloor (n/t) \rfloor n} \qquad (6.17)$$

$$= \frac{(n-t)\lfloor n/t \rfloor}{\lfloor (n/t) \rfloor n}$$

$$= \frac{n-t}{n}$$

The advantages of NPS-T approach are that:

The data is encoded and decoded online, and it will be sent and received in different rounds. Once the receivers detect failures, they are able to obtain a copy of the lost data immediately without delay by querying the neighboring nodes with unbroken working paths.

The approach is suitable for applications that do not tolerate packet delay such as real-time applications, e.g., voice and TV transmissions.

The recovery is assured with 100%. As far as t paths will carry encoded data, up to t failures can be recovered.

Using this strategy, no extra paths are needed. This will make this approach more suitable for applications, in which adding extra paths, or reserving links or paths just for protection, may not be feasible. Another important case in which this strategy outperforms other strategies is when the network graph limits the number of connections which can be protected together using dedicated paths. The proposed strategy overcomes this shortcoming.

Since in the real case scenario, the number of failure is very small compared to the number of working paths, the NPS-T performs well. This is due to the fact that %70 suffer from a single link failure, and 30 percent suffer from two and three link failures. We will elaborate the implementation issues in S. A. Aly and A. E. Kamal, Reduced capacity coding-based network protection strategies, *IEEE Transaction on Networking, under submission*, 2008.

The encoding and decoding operations are linear, and the coefficients of the variables $x_i^j$ are taken from a finite field with q>2 elements.

B. Encoding Operations

We assume that there is a connection link(s) $L_i$ (L) with the unit capacity from a source $s_i$ (S) to a receiver $r_i$ (R). The data sent from the sources S to the receivers R are transmitted in rounds. In case of NPS-T, there are t protection paths that protect against t link failures due to a single node failure. Therefore there are $\lfloor n/t \rfloor$ rounds, and in each round the capacity is given by n–t.

We consider the case in which all symbols $x_i^j$ belong to the same round. The first t sources transmit the first encoded data units $y_1, y_2, \ldots, y_t$, and in the second round transmit $y_{t+1}, y_{t+2}, \ldots, y_{2t}$, and so on. All sources S and receiver R must keep track of the round numbers. Let $ID_{s_i}$ and $x_{si}$ be the ID and data initiated by the source $s_i$. Assume the round time j in session δ is given by $t_δ^j$. Then the source $s_i$ will send the a packet$_{s_i}$ on the working path which includes $$\text{Packet}_{s_i} = (ID_{s_i}, x_i^\ell, t_δ^\ell) \quad (6.18)$$

Also, the source $s_j$, that transmits on the protection path, will send a packet packets$_{sj}$ $$\text{Packet}_{s_j} = (ID_{s_j}, y_k, t_δ^t) \quad (6.19)$$

where $y_k$ is defined in (5.15). Hence the protection path is used to protect the data in round $\ell$. The encoded data yk is computed in a simple way, the source $s_j$ will collect all sources' data and add proper coefficients as performing the encoding operation; this is explained below. In this case every data unit $x_i^\ell$ multiplied by a unique coefficient $a_\ell \in F$ q. This will differentiate the encoded data $y_i$'s. Also, the sender $s_k$ will send a packet$_{sk}$ in the protection path as follows $$\text{Packet}_{s_k} = \left(ID_{s_k}, \sum_{i=1}^{n} a_i^\ell x_i^t t_δ^t\right) \quad (6.20)$$

$s_k$ chooses different coefficients in the finite field $F_q$. So, we have a system of t independent equations at each round time that will be used to recover at most t unknown variables. The strategy NPS-T is a generalization of protecting against a single path failure shown in the previous section in which t protection paths are used instead of one protection path in case of one failure. We also notice that most of the network operations suffer from one and two path failures. D. Zhou and S. Subramaniam, Survivability in optical networks, *IEEE network*, 14:16-23, November/December 2000; A. K. Somani, *Survivability and traffic grooming in Optical Networks*, Cambridge Press, 2006.

C. Proper Coefficients Selection

One way to select the coefficients $a_j^{t_i}$'s in each round such that we have a system of t linearly independent equations is by adapting the parity check matrix of a nonprimitive narrow-sense BCH code of length n and designed distance t. Let a be a primitive element in $F_q$. Let q be the order of a finite field, and a be the root of unity. Then we modify and use the parity check matrix of a BCH code to define the coefficients of the senders as:

$$H_{bch} = \begin{bmatrix} 1 & \alpha & \alpha^2 & \ldots & \alpha^{N-1} \\ 1 & \alpha^2 & & & \\ \vdots & \vdots & \vdots & \ddots & \vdots \\ 1 & \alpha^{t-1} & \alpha^{2(t-1)} & \ldots & \alpha^{(t-1)(n-1)} \end{bmatrix} \quad (6.21)$$

We have the following assumptions about the encoding operations.

1) Clearly if we have one failure t=1, then all coefficients will be one. The first sender will always choose the unit value.

2) If we assume $d_0=t$, then the $y_1, y_2, \ldots, y_t$ equations are written as:

$$y_1 = \sum_{i=t+1}^{n} x_i^1, \quad y_2 = \sum_{i=t+1}^{n} \alpha^{(i-1)} x_i^2, \quad (6.22)$$

$$y_j = \sum_{i=t+1}^{n} \alpha^{i(j-1) mod(q-1)} x_i^t, \quad (6.23)$$

Therefore, the scheme that describes the encoding operations in the first round for t link failures can be described as (6.24)

|  | round one, t failures | | | | |
|---|---|---|---|---|---|
|  | $y_1$ | $y_2$ | $y_3$ | ... | $y_t$ |
| $s_1 \to r_1$ | 1 | 1 | 1 | ... | 1 |
| $s_2 \to r_2$ | 1 | $\alpha$ | $\alpha^2$ | ... | $\alpha^{t-1}$ |
| $s_3 \to r_3$ | 1 | $\alpha^2$ | $\alpha^4$ | ... | $\alpha^{2(t-1)}$ |
| ⋮ | ⋮ | ⋮ | ⋮ | ⋮ | ⋮ |
| $s_i \to r_i$ | 1 | $\alpha^{i-1}$ | ... | ... | $\alpha^{(i-1)(t-1)}$ |
| ⋮ | ⋮ | ⋮ | ⋮ | ⋮ | ⋮ |
| $s_n \to r_n$ | 1 | $\alpha^{n-1}$ | $\alpha^{2(n-1)}$ | ... | $\alpha^{(t-1)(n-1)}$ |

This equation gives the general theme to choose the coefficients at any particular round in any session. However, the encoded data $y_i$'s are defined as shown in Equation (6.23). In other words, for the first round in session one, the coefficients of the plain data $x_1, x_2, \ldots, x_t$ are set to zero.

D. Decoding Operations

We know that the coefficients $\alpha_1^t, \alpha_n^t, \ldots, \alpha_n^t$ are elements of a finite field, hence the inverses of these elements exist and they are unique. Once a node fails which causes t data units to be lost, and once the receivers receive t linearly independent equations, they can linearly solve these equations to obtain the unknown t data units. At one particular session j, we have three cases for the failures i) All t link failures happened in the working paths, i.e. working paths have failed to convey the messages $x_i^\ell$ in round $\ell$. In this case, n−t equations will be received, t of which are linear combinations of n−t data units, and the remaining n−2t are explicit $x_i$ data units, for a total of n−t equations in n−t data units. In this case any t equations (packets) of the t encoded packets can be used to recover the lost data.

ii) All t link failures happened in the protection paths. In this case, the exact remaining n−t packets are working paths and they do not experience any failures. Therefore, no recovery operations are needed.

iii) The third case is that the failure might happen in some working and protection paths simultaneously in one particular round in a session. The recover can be done using any t protection paths as shown in case i.

6.7. Bounds on the Finite Field Size, Fq

In this section we derive lower and upper bound on the alphabet size required for the encoding and decoding operations. In the proposed schemes we assume that unidirectional connections exist between the senders and receivers, which the information can be exchanged with neglected cost. The first result shows that the alphabet size required must be greater than the number of connections that carry unencoded data. Theorem 6.8: Let n be the number of connections in the network model $\mathcal{N}$. Then the receivers are able to decode the encoded messages over Fq and will recover from t≥2 path failures if $$q \geq n-t+1 \qquad (6.25)$$

Also, if $q=p^r$, then $r \leq \lceil \log_p(n+1) \rceil$. The binary field is sufficient in case of a single path failure.

Proof:

We will prove the lower bound by construction. Assume a NPS-T at one particular time $t_\delta^\ell$ in the round $\ell$ in a certain session δ. The protection code of NPS-T against t path failures is given as $$C_t = \begin{bmatrix} 1 & 1 & 1 & \ldots & 1 \\ 1 & \alpha & \alpha^2 & \ldots & \alpha^{n-1} \\ 1 & \alpha^2 & \alpha^4 & \ldots & \alpha^{2(n-1)} \\ \vdots & \vdots & \vdots & \ddots & \vdots \\ 1 & \alpha^{t-1} & \alpha^{2(t-1)} & \ldots & \alpha^{(t-1)(n-1)} \end{bmatrix} \qquad (6.26)$$

Without loss of generality, the interpretation of Equation (6.26) is as follows:
i) The columns correspond to the senders S and rows correspond to t encoded data $y_1, y_2, \ldots, y_t$.
ii) The first row corresponds to $y_1$ if we assume the first round in session one. Furthermore, every row represents the coefficients of every senders at a particular round.
iii) The column i represents the coefficients of the sender $s_i$ through all protection paths $L_1, L_2, \ldots, L_t$.
iv) Any element $\alpha^i \in F_q$ appears once in a column and row, except in the first column and first row, where all elements are one's.
v) All columns (rows) are linearly independent.

Due to the fact that the t failures might occur at any t working paths of $L=\{l_1, l_2, \ldots, l_n\}$, then we can not predict the t protection paths as well. This means that t out of the n columns do not participate in the encoding coefficients, because t paths will carry encoded data. We notice that removing any t out of the n columns in Equation (6.26) will result in n−t linearly independent columns. Therefore the smallest finite field that satisfies this condition must have n−t+1 elements.

The upper bound comes from the case of no failures, hence q≥(n+1). Assume q is a prime power, then the result follows.
if $q=2^r$, then in general the previous bound can be stated as $$n-t+1 \leq q \leq 2^{\lceil \log_2(n+1) \rceil} \qquad (6.27)$$

We defined the feasible solution for the encoding and decoding operations of NPS-T as the solution that has integer reachable upper bounds.

Corollary 6.9:

The protection code 26 always gives a feasible solution.

The following result shows the maximum number of admissible paths which can suffer from failure, and still achieve decoding successfully.

Lemma 6.10:

Let n and t be the number of connections and failures in the network model N, then we have $t \leq \lfloor n/2 \rfloor$.

Proof

The proof is a direct consequence from the fact that the protection paths must be less than or equal to the number of working paths. This lemma shows that one can not provide protection paths better than duplicating the number of working paths.

6.8 Conclusions

In this section we present a model for network protection against a single node failure. We considered the cases where a failed node might have single and multiple working paths. We demonstrated implementation strategy for the proposed network protection schemes. We showed that protecting a single node failure can be stated as protecting against t link failures. Consequently, the proposed solution to protect against t link failures can also be used as a solution to the problems stated in: A. E. Kamal, 1+N protection in optical mesh networks using network coding on p-cycles, In *Proc. of the IEEE Globecom*, 2006; A. E. Kamal, 1+N protection against multiple faults in mesh networks, In *Proc. of the IEEE International Conference on Communications (ICC)*, 2007; The network capacity is computed in cases of single and multiple path failures. Furthermore, bounds on the network resources are established.

Therefore various embodiments for providing network protection have been described. The present invention contemplates numerous variations, options, and alternatives, including those described throughout the specification. All of references cited are herein incorporated by reference in their entirety.

What is claimed is:

1. A method for jointly protecting a plurality of link disjoint paths between senders and receivers in a communications network against failures without rerouting data around a link or a node failure, the method comprising:

sending data units by the senders over working paths in the communications network;

applying network coding to form a combination of data units from a plurality of the senders;

sending the combination of the data units over a backup circuit of the communications network;

if one or more failures occur resulting in loss of one or more of the data units, then recovering at the receivers the one or more of the data units from the combination of data units sent over the backup circuit of the communications network and the data units received over non-failed working paths; and wherein the backup circuit thereby provides protection for the working paths by providing 100 percent protection against single link failure on any of the working paths without rerouting data around the link or the node failure.

2. The method of claim 1 wherein sending the combination of data units over the communications network being in-band with user data wherein combinations of the data units alternate with data sent on the working paths in order to achieve fairness between senders.

3. The method of claim 1 wherein the forming of the combination of data units further comprises sending data units by the plurality of senders on a set of edges connecting the senders, with nodes at ends of the edges performing an encoding operation to provide an encoded combination of data units, selecting one or more senders from the plurality of the senders and distributing the encoded combination of data units to the selected sender.

4. The method of claim 3 wherein the encoding operation comprises bit-wise operations.

5. The method of claim 1 wherein the one or more failures causes a single working path to fail.

6. The method of claim 1 wherein the one or more failures causes more than one working path to fail.

7. The method of claim 1 wherein the one or more failures causes at least one node to fail.

8. A method for providing protection in a network having a plurality of senders and a plurality of receivers and a plurality of working paths between the plurality of the senders and the plurality of the receivers, comprising: providing protection, by using a single circuit, for the plurality of the working paths by providing 100 percent protection against single link failure on any of the plurality of working paths without rerouting data around a link or a node failure by applying network coding to form a combination of data units from the plurality of the senders such that if the link or the node failure occur resulting in loss of the data from one of the senders then the data is recovered at the receivers from the combination of data units.

9. The method of claim 8 further comprising using network coding to construct a signal for the single circuit from signals from each of the plurality of working paths.

10. A method for jointly protecting a plurality of unidirectional unicast connections on link disjoint paths between senders and receivers in a communications network against failures without rerouting data around a link or a node failure, the method comprising:

sending data units by the senders over the communications network;

applying network coding to form a combination of data units from data units from a plurality of the senders and sending the combination to a bridge node, applying network coding to form a combination of data units from a plurality of receivers of non-failed working paths, and sending the combination to the bridge node, the applying network coding performed at the bridge node in the communication network, the bridge node having incoming links to receive the combinations of data units, and outgoing links to receivers;

sending the combination of data units from the bridge node over the outgoing links to receivers;

if one or more failures occur resulting in loss of one or more of the data units, then recovering the one or more of the data units at a receiver node from the combination of data units received from the bridge node;

if one or more data errors occurs resulting in loss of one or more of the data units in a plurality of unidirectional, unicast connections, then recovering the one or more of the data units from the combination of data units; and wherein the combination of data units being formed by a bitwise XOR operation.

11. A system, comprising:
a network;
a plurality of senders in the network;
a plurality of receivers in the network;
a working circuit from the senders to the receivers for carrying working signals;
a bridge node between the senders and the receivers, the bridge node providing for combining data from each of the senders using network coding to form a combination and send the combination to the receivers such that if one or more failures occur resulting in loss of data from one of the senders then the data is recovered at the receivers from the combination; and
wherein the network coding for combining the data is performed using a bitwise XOR operator.

12. A system, comprising:
a working circuit between senders and receivers in a network for carrying working signals;
a bridge node between the senders and the receivers, the bridge node providing for combining data from each of the senders using network coding to form a combination and send the combination to the senders and receivers such that if one or more failures occur resulting in toss of data from one of the senders then the data is recovered at the receivers from the combination.

13. The system of claim 12 wherein the network coding for combining the data is performed using a bitwise XOR operator.

* * * * *